United States Patent
Dhanapal et al.

(10) Patent No.: US 12,302,172 B2
(45) Date of Patent: May 13, 2025

(54) SYSTEMS, METHODS, AND DEVICES FOR OPTIMIZING RADIO ACCESS TECHNOLOGY AND RESOURCE SELECTION

(71) Applicant: Apple Inc., Cupertino, CA (US)

(72) Inventors: Muthukumaran Dhanapal, Sunnyvale, CA (US); Ajay Singh, San Jose, CA (US); Ajoy K Singh, Milpitas, CA (US); Alan Tseng, Saratoga, CA (US); Lakshmi N Kavuri, San Jose, CA (US); Neeraj D Vaghela, San Jose, CA (US); Raghuveer Mallikarjunan, Sunnyvale, CA (US); Rajesh Ambati, Los Altos Hills, CA (US); Thanigaivelu Elangovan, Cupertino, CA (US); Vijendrakumar K Ashiwal, San Jose, CA (US); Rohan C Malthankar, San Jose, CA (US); Rafael L Rivera-Barreto, Santa Clara, CA (US); Sreevalsan Vallath, Dublin, CA (US); Divyaprakash P Bhojkumar, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 307 days.

(21) Appl. No.: 17/850,111

(22) Filed: Jun. 27, 2022

(65) Prior Publication Data

US 2023/0076738 A1    Mar. 9, 2023

Related U.S. Application Data

(60) Provisional application No. 63/242,121, filed on Sep. 9, 2021.

(51) Int. Cl.
*H04W 28/086*    (2023.01)
*H04W 28/02*    (2009.01)
(Continued)

(52) U.S. Cl.
CPC ... *H04W 28/0865* (2023.05); *H04W 28/0247* (2013.01); *H04W 28/0284* (2013.01);
(Continued)

(58) Field of Classification Search
None
See application file for complete search history.

(56) References Cited

U.S. PATENT DOCUMENTS 9,307,474 B1    4/2016   Tailor et al.
11,019,542 B1 *  5/2021  Tong ............... H04W 36/30
(Continued)

FOREIGN PATENT DOCUMENTS

CN    112004253 A    11/2020
WO   2021/020952 A1    2/2021

OTHER PUBLICATIONS

EP Extended Search Report; Application No. 22181815.6 mailing date Jan. 5, 2023.

*Primary Examiner* — Ajit Patel
(74) *Attorney, Agent, or Firm* — Eschweiler & Potashnik, LLC

(57) ABSTRACT

Techniques described herein may enable a user equipment (UE) to optimize radio access technology (RAT) and radio resources (e.g., bandwidth parts (BWPs)) when communicating with the network. This may be based on one or more factors or conditions, such as whether the UE is currently using 4th generation (4G) RAT or 5th generation (5G) RAT, whether the UE is in an active mode or idle mode, a BWP used by the UE, whether an application or network service requires a certain throughput, a type of application being used by the UE, an amount of network congestion, and so on. RAT optimization may also be based on whether the UE is using a frequency range 1 (FR1) or frequency range 2 (FR2), whether the UE is stationary or moving, whether the UE is experiencing beam failures, uplink (UL) switches, link (Continued)

quality measurements (LQMs), reference signal received power (RSRP) measurements, and so on.

20 Claims, 13 Drawing Sheets

(51) Int. Cl.
*H04W 36/00* (2009.01)
*H04W 36/36* (2009.01)
H04W 36/30 (2009.01)
(52) U.S. Cl.
CPC ..... *H04W 36/00222* (2023.05); *H04W 36/36* (2013.01); *H04W 36/362* (2023.05); H04W 36/304 (2023.05)

(56) References Cited

U.S. PATENT DOCUMENTS

| | | | | |
|---|---|---|---|---|
| 2011/0319085 | A1* | 12/2011 | Ishii | H04W 88/06 |
| | | | | 455/436 |
| 2020/0383022 | A1* | 12/2020 | Shrestha | H04W 36/0064 |
| 2021/0051550 | A1* | 2/2021 | Latheef | H04W 36/362 |

* cited by examiner

SYSTEMS, METHODS, AND DEVICES FOR OPTIMIZING RADIO ACCESS TECHNOLOGY AND RESOURCE SELECTION

FIELD

This disclosure relates to wireless communication networks including techniques for managing systems and devices of wireless communication networks.

BACKGROUND

Wireless communication networks may include user equipment (UEs) (e.g., smartphones, tablet computers, etc.) capable of communicating with base stations and other network nodes. Aspects of wireless communication networks include the manner, conditions, scenarios, and procedures by which wireless devices connect and otherwise communicate with one another. This may involve network capabilities, bandwidth availability, network congestion, device preferences, modes of communication, applications, types of data being communicated, degree to which data may be time-sensitive, etc.

BRIEF DESCRIPTION OF THE DRAWINGS

The present disclosure will be readily understood and enabled by the detailed description and accompanying figures of the drawings. Like reference numerals may designate like features and structural elements. Figures and corresponding descriptions are provided as non-limiting examples of aspects, implementations, etc., of the present disclosure, and references to "an" or "one" aspect, implementation, etc., may not necessarily refer to the same aspect, implementation, etc., and may mean at least one, one or more, etc.

DETAILED DESCRIPTION

Figure 1:
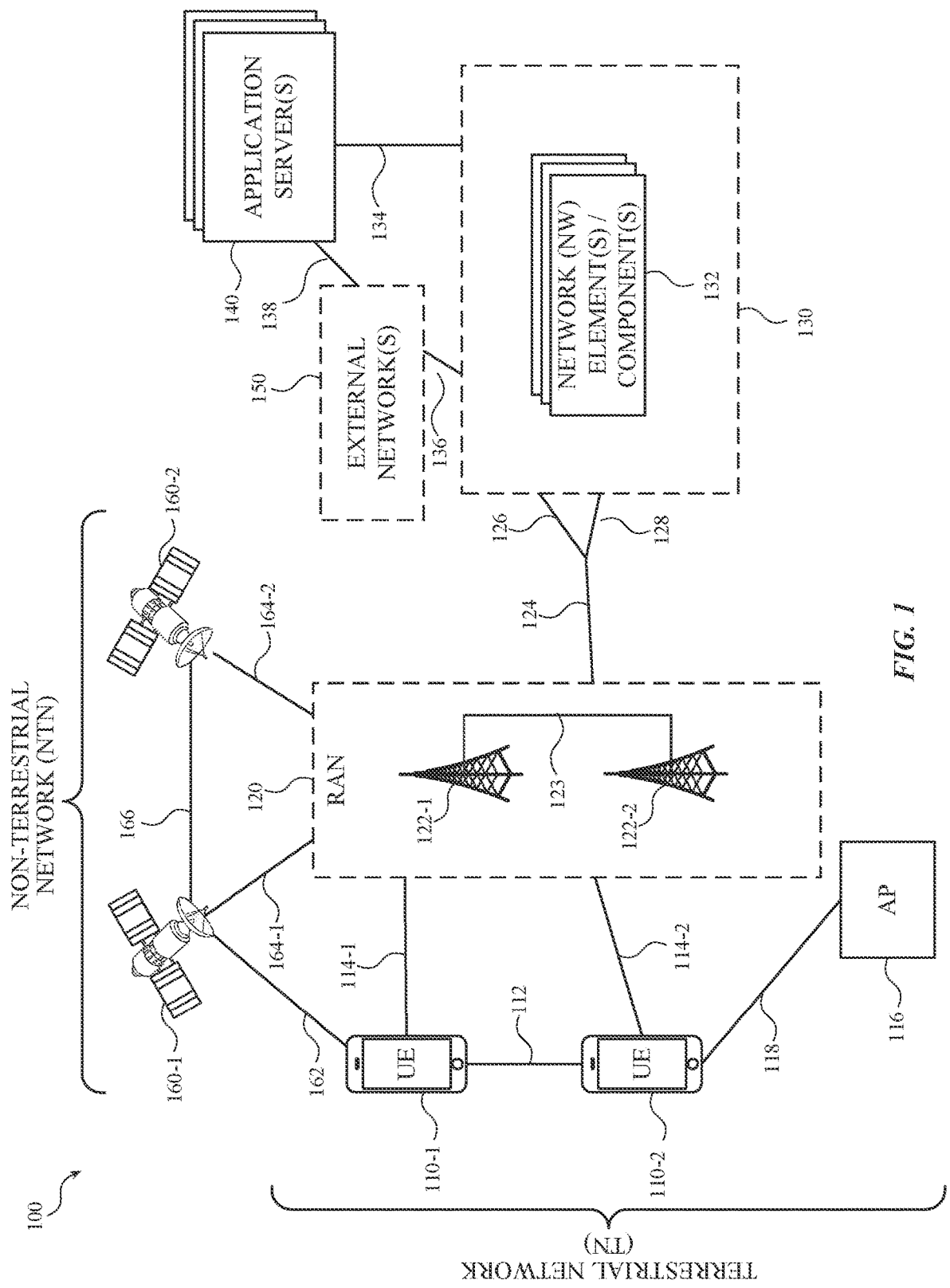
FIG. 1 is a diagram of an example network according to one or more implementations described herein.

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

Wireless communication networks may include user equipment (UEs) capable of communicating wirelessly with base stations and other network nodes. These devices and communications may implement different types of radio access technology (RAT), which may involve fourth generation (4G) or Long-Term Evolution (LTE) technology, fifth generation (5G) or new radio (NR) technology, sixth generation (6G) technology, and so on, of the 3rd Generation Partnership Project (3GPP). As described herein, references to 5G technology, NR technology, 5G RAT, NR RAT, etc., may refer to 5G or NR RAT as described by the communication standards of the 3GPP. Similarly, references to 4G technology, LTE technology, 4G RAT, LTE RAT, etc., may refer to 4G or LTE RAT as described by the communication standards of the 3GPP.

5G RAT may include two frequency ranges, frequency range 1 (FR1) and frequency range 2 (FR2). FR1 may include communications occurring at below a certain frequency (e.g., below 6 Gigahertz (GHz) (also referred to as sub-6 GHz or SUB6)), while FR2 may include communication occurring at above FR1 frequencies (e.g., above 6 GHz). FR2 may also be referred to as the millimeter (mm) spectrum or the mmWave. In some instances, FR1 may be designated for carrying traditional cellular traffic, while FR2 may be designated for shorter range, higher data rate traffic. By contrast, 4G RAT LTE is generally designed to work across frequency bands such as those ranging from 450 Megahertz (MHz) up to 3.8 GHz. The available bandwidths, in 4G RAT, may also be flexible, starting with 1.4 MHz up to 20 MHz with carrier aggregation (CA) allowing use of wider multiples.

In some implementations, one or more tools or metrics may be implemented to measure and/or ensure that a connection is suitable for an application or service (e.g., to determine whether a connection is suitable for a particular application or service. An example of such a tool may include implementation of a link quality metric (LQM). As described herein, a LQM may include a baseline metric a UE may implement to determine whether a data-intensive application or service (such as a voice-over-Internet Protocol (VoIP) application, data streaming application etc.) is achieving a data throughput relative to a specified threshold representing sufficient quality and reliability. LQM may also, or alternatively, cause or indicate that background (BG) discretionary data exchanges (e.g., less time-sensitive data) may be blocked, rescheduled, or postposed while data intensive applications or services are running, thereby helping ensure a given target throughput.

5G RAT may also implement bandwidth parts (BWPs). A BWP may include common resource blocks within a channel bandwidth, or a subset of common resource blocks. A UE may be configured with up to 4 downlink (DL) BWPs per carrier and up to 4 uplink (UL) BWP per carrier. In some implementations, a single BWP may be active in each direction (DL and UL) per carrier, and a UE may receive physical downlink control channel (PDCCH) information, physical uplink control channel (PUCCH) information, physical downlink shared channel (PDSCH) information, and physical uplink control channel (PUSCH) information via an active DL and UL BWP. When accessing a base station, the UE may us an initial BWP. The initial DL WBP may be sent to the UE via a system information block (SIB) or via a set of resource blocks belonging to a control resource set (CORESET) of a PDCCH common search space. BWP selection or switching may occur during UL grant by the PDCCH, due to a BWP inactivity timer if the timer is defined, during RACH procedure, and a specific BWP can become active depending on various situations in the call processing.

Further, 5G technology may be implemented in a non-standalone (non-SA or NSA) manner or a standalone (SA) manner. In a non-SA scenario, a 5G radio access network (RAN) may be applied to a 4G wireless communication network (e.g., a network that also implements 4G RANs, a 4G core network, etc.). In this scenario, 5G capable UEs may first establish connectivity to the network using 4G RAT, and if 5G RAT is available, 5G connectivity may be put in place for one or more types of data or connections. However, unless 4G is available first, the device may not access 5G in a non-SA scenario network. In a 5G SA scenario, a 5G RAN may be implemented along with a 5G core, providing for a complete, end-to-end 5G wireless communication network. While 4G and 5G technologies may provide for different frequency ranges, bandwidths, and RATs, currently available technologies fail to provide adequate solutions for optimizing 4G and 5G RATs for performance and efficiency. For example, currently available technologies fail to provide solutions for enabling UEs to transition between 4G and 5G RATs based on usage, availability, congestion, the need to conserve battery power, etc.

Techniques, described herein, may enable a UE to select optimal RATs and radio resources (e.g., BWPs) when communicating with the network. As described below, this may be based on factors, such as whether the UE is currently using 4G RAT or 5G RAT, a BWP being used by the UE, whether an application or network service being used by the UE requires a certain throughput, a level of congestion in a 4G RAN or 5G RAN, a mode of operation of the UE (e.g., idle or active), and so on.

For example, a UE may be connected to the network in a 5G SA situation. Generally, while a user is interacting with the UE or the UE is operating an application or feature with high data requirements (e.g., a data streaming application) the UE may remain on a 5G RAT with a BWP with greater than or equal to 20 Megahertz (MHz). When the user is not interacting with the UE or the UE is not operating an application or feature with high data requirements, the UE may be on 5G RAT with a BWP with less than 20 MHz or fall back to LTE. And the UE to switch between 5G RAT, 4G RAT, and appropriate BWPs as the preferences of the UE changes and the availability of RATs and BWPs change as well. Thus, the techniques described herein, may enable a UE a UE to maintain optimal RAT and BWP selection by causing the UE to switch between RATs and BWPs based on the usage, data throughput requirements, etc., of RATs and BWPs available to the UE.

Techniques described herein, may further enable the UE to select efficient RATs for high data applications or services (e.g., voice-over-Internet Protocol (VoIP) call or session, which may include just a VoIP audio call or a voice over IP video call, or data streaming service). For example, a stationary UE may use FR2 to run a high data application (e.g., a VoIP call) and once the UE begins moving, the UE may continue to use FR2 unless or until one or more triggers occurs, in which case the UE may switch to FR1 or LTE. Examples of such triggers may include successive beam failures beyond a beam failure threshold. For example, if the UE experiences 3 successive beam failures, the UE may discontinue using FR2.

In another example, if the UE experiences an uplink (UL) switch (e.g., the network switches the UL of the UE from LTE to 5G, for from 5G to LTE). Other examples may include, the UE experiencing a packet data convergence protocol (PDCP) reorder timer expiration, or a combination of a poor LQM (e.g., LQM=−107 dB), low throughput (<0.5 Megabits/second (Mbps)), and a good LTE LQM (e.g., LQM=−100 dB). If/when the UE is using 4G RAT for a high data applications or services, the UE may also switch back to a 5G RAT. For example, when the UE experiences network congestion or a data flow bottleneck (e.g., through a redline gear shifter (RLGS) or another component) the UE may switch from the 4G RAT to an 5G RAT technology (e.g., 5G FR2). Thus, techniques described herein may enable the UE to switch between RATs based on applications and services being used by the UE and network conditions being experienced by the UE.

Techniques described herein may also enable the UE to optimize data streaming by implementing an enhanced buffering strategy. Typical buffering strategies may cause the UE to buffer a given amount of data. For example, a buffering strategy for a video service may cause the UE to buffer a minute worth of video and then wait until a good portion of the buffered data has been watched before buffering another minute worth of video. When the video is being buffered using a high throughput band, such as an FR2 band, buffering a minute of video may only take a few seconds, upon which the UE may go idle until it is time to download more data, and on and on, while maintaining the 5G RAT connection.

An enhanced buffering strategy, as described herein, may enable the UE to optimize power consumption by disable the 5G RAT connection upon entering idle mode and returning to 5G RAT when needed (e.g., in response to one or more triggers. Examples of such triggers may include the UE detecting a data flow bottleneck (e.g., through a redline gear shifter (RLGS) or another component), a new request or service requiring high bandwidth usage (e.g., from another application or service), or an indication that the UE is to exit from the idle state and re-buffer the on-going streaming service. In some implementations, the UE may switch from 5G RAT to idle or from idle to 5G RAT based on a buffer level indication. For example, a buffer level indication for a live streaming service may be set to zero (0) in which case the UE may not disable the 5G RAT connection; a buffer level indication on a non-zero value may indicate that buffering is ongoing in which case UE may not disable the 5G RAT connection or may leave an idle mode and re-establishing an 5G RAT connection; and a buffer level indication of a maximum may cause the UE to release the 5G RAT connection and enter into an idle mode. As such, techniques described herein may enable a UE to optimize the use of power and RAT by releasing connections that may go unused for a period and re-establishing RAT connections when they are to be used again.

Techniques, described herein, may also enable efficient us of UL and DL resources for UL centric data sessions. A UL centric data session may include a scenario in which a UE is to upload a notable amount of data (e.g., pictures, videos, etc.) without downloading a notable amount of data. In such a scenario, when the UE is connected to the network via a 5G RAT connection. The UE may drop the 5G RAT connection for an 4G RAT connection under certain conditions, such as when a higher order LTE UL carrier (or carrier aggregation scenario) is possible, when NR LQM is poor (e.g., −107 dB), and LTE LQM is good (e.g., −100 dB). Conditions for switching from an 5G RAT connection to the 4G RAT connection may also include when the 5G RAT is experiencing frequent UL switches (e.g., >2) and UL throughput is higher when LTE is the primary RAT being used. As such, the techniques described herein may enable a UE to switch from 5G RAT connections to 4G RAT connections for UL procedures that are more power efficient and more reliable.

FIG. 1 is an example network 100 according to one or more implementations described herein. Example network 100 may include UEs 110-1, 110-2, etc. (referred to collectively as "UEs 110" and individually as "UE 110"), a radio access network (RAN) 120, a core network (CN) 130, application servers 140, external networks 150, and satellites 160-1, 160-2, etc. (referred to collectively as "satellites 160" and individually as "satellite 160"). As shown, network 100 may include a non-terrestrial network (NTN) comprising one or more satellites 160 (e.g., of a global navigation satellite system (GNSS)) in communication with UEs 110 and RAN 120.

The systems and devices of example network 100 may operate in accordance with one or more communication standards, such as 2nd generation (2G), 3rd generation (3G), 4th generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of example network 100 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 110 may include smartphones (e.g., handheld touchscreen mobile computing devices connectable to one or more wireless communication networks). Additionally, or alternatively, UEs 110 may include other types of mobile or non-mobile computing devices capable of wireless communications, such as personal data assistants (PDAs), pagers, laptop computers, desktop computers, wireless handsets, etc. In some implementations, UEs 110 may include internet of things (IoT) devices (or IoT UEs) that may comprise a network access layer designed for low-power IoT applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more.

Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

UEs 110 may communicate and establish a connection with (e.g., be communicatively coupled) with RAN 120, which may involve one or more wireless channels 114-1 and 114-2, each of which may comprise a physical communications interface/layer. In some implementations, a UE may be configured with dual connectivity (DC) as a multi-radio access technology (multi-RAT) or multi-radio dual connectivity (MR-DC), where a multiple receive and transmit (Rx/Tx) capable UE may use resources provided by different network nodes (e.g., 122-1 and 122-2) that may be connected via non-ideal backhaul (e.g., where one network node provides NR access and the other network node provides either E-UTRA for LTE or NR access for 5G). In such a scenario, one network node may operate as a master node (MN) and the other as the secondary node (SN). The MN and SN may be connected via a network interface, and at least the MN may be connected to the CN 130. Additionally, at least one of the MN or the SN may be operated with shared spectrum channel access, and functions specified for UE 110 can be used for an integrated access and backhaul mobile termination (IAB-MT). Similar for UE 101, the IAB-MT may access the network using either one network node or using two different nodes with enhanced dual connectivity (EN-DC) architectures, new radio dual connectivity (NR-DC) architectures, or the like. In some implementations, a base station (as described herein) may be an example of network nod 122.

As shown, UE 110 may also, or alternatively, connect to access point (AP) 116 via connection interface 118, which may include an air interface enabling UE 110 to communicatively couple with AP 116. AP 116 may comprise a wireless local area network (WLAN), WLAN node, WLAN termination point, etc. The connection 1207 may comprise a local wireless connection, such as a connection consistent with any IEEE 702.11 protocol, and AP 116 may comprise a wireless fidelity (Wi-Fi®) router or other AP. While not explicitly depicted in FIG. 1, AP 116 may be connected to another network (e.g., the Internet) without connecting to RAN 120 or CN 130. In some scenarios, UE 110, RAN 120, and AP 116 may be configured to utilize LTE-WLAN aggregation (LWA) techniques or LTE WLAN radio level integration with IPsec tunnel (LWIP) techniques. LWA may involve UE 110 in RRC_CONNECTED being configured by RAN 120 to utilize radio resources of LTE and WLAN. LWIP may involve UE 110 using WLAN radio resources (e.g., connection interface 118) via IPsec protocol tunneling to authenticate and encrypt packets (e.g., Internet Protocol (IP) packets) communicated via connection interface 118. IPsec tunneling may include encapsulating the entirety of original IP packets and adding a new packet header, thereby protecting the original header of the IP packets.

RAN 120 may include one or more RAN nodes 122-1 and 122-2 (referred to collectively as RAN nodes 122, and individually as RAN node 122) that enable channels 114-1 and 114-2 to be established between UEs 110 and RAN 120. RAN nodes 122 may include network access points configured to provide radio baseband functions for data and/or voice connectivity between users and the network based on one or more of the communication technologies described herein (e.g., 2G, 3G, 4G, 5G, WiFi, etc.). As examples therefore, a RAN node may be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 122 may include a roadside unit (RSU), a transmission reception point (TRxP or TRP), and one or more other types of ground stations (e.g., terrestrial access points). In some scenarios, RAN node 122 may be a dedicated physical device, such as a macrocell base station, and/or a low power (LP) base station for providing femtocells, picocells or other like having smaller coverage areas, smaller user capacity, or higher bandwidth compared to macrocells. As described below, in some implementations, satellites 160 may operate as base stations (e.g., RAN nodes 122) with respect to UEs 110. As such, references herein to a base station, RAN node 122, etc., may involve implementations where the base station, RAN node 122, etc., is a terrestrial network node and also to implementation where the base station, RAN node 122, etc., is a non-terrestrial network node (e.g., satellite 160).

Some or all of RAN nodes 122 may be implemented as one or more software entities running on server computers as part of a virtual network, which may be referred to as a centralized RAN (CRAN) and/or a virtual baseband unit pool (vBBUP). In these implementations, the CRAN or vBBUP may implement a RAN function split, such as a packet data convergence protocol (PDCP) split wherein radio resource control (RRC) and PDCP layers may be operated by the CRAN/vBBUP and other Layer 2 (L2) protocol entities may be operated by individual RAN nodes 122; a media access control (MAC)/physical (PHY) layer split wherein RRC, PDCP, radio link control (RLC), and MAC layers may be operated by the CRAN/vBBUP and the PHY layer may be operated by individual RAN nodes 122; or a "lower PHY" split wherein RRC, PDCP, RLC, MAC layers and upper portions of the PHY layer may be operated by the CRAN/vBBUP and lower portions of the PHY layer may be operated by individual RAN nodes 122. This virtualized framework may allow freed-up processor cores of RAN nodes 122 to perform or execute other virtualized applications.

In some implementations, an individual RAN node 122 may represent individual gNB-distributed units (DUs) connected to a gNB-control unit (CU) via individual F1 interfaces. In such implementations, the gNB-DUs may include one or more remote radio heads or radio frequency (RF) front end modules (RFEMs), and the gNB-CU may be operated by a server (not shown) located in RAN 120 or by a server pool (e.g., a group of servers configured to share resources) in a similar manner as the CRAN/vBBUP. Additionally, or alternatively, one or more of RAN nodes 122 may be next generation eNBs (i.e., gNBs) that may provide evolved universal terrestrial radio access (E-UTRA) user plane and control plane protocol terminations toward UEs 110, and that may be connected to a 5G core network (5GC) 130 via an NG interface.

Any of the RAN nodes 122 may terminate an air interface protocol and may be the first point of contact for UEs 110. In some implementations, any of the RAN nodes 122 may fulfill various logical functions for the RAN 120 including, but not limited to, radio network controller (RNC) functions such as radio bearer management, uplink and downlink dynamic radio resource management and data packet scheduling, and mobility management. UEs 110 may be configured to communicate using orthogonal frequency-division multiplexing (OFDM) communication signals with each other or with any of the RAN nodes 122 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations may not be limited in this regard. The OFDM signals may comprise a plurality of orthogonal subcarriers.

In some implementations, a downlink resource grid may be used for downlink transmissions from any of the RAN nodes 122 to UEs 110, and uplink transmissions may utilize similar techniques. The grid may be a time-frequency grid (e.g., a resource grid or time-frequency resource grid) that represents the physical resource for downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises resource blocks, which describe the mapping of certain physical channels to resource elements. Each resource block may comprise a collection of resource elements (REs); in the frequency domain, this may represent the smallest quantity of resources that currently may be allocated. There are several different physical downlink channels that are conveyed using such resource blocks.

Further, RAN nodes 122 may be configured to wirelessly communicate with UEs 110, and/or one another, over a licensed medium (also referred to as the "licensed spectrum" and/or the "licensed band"), an unlicensed shared medium (also referred to as the "unlicensed spectrum" and/or the "unlicensed band"), or combination thereof. A licensed spectrum may include channels that operate in the frequency range of approximately 400 MHz to approximately 3.8 GHz, whereas the unlicensed spectrum may include the 5 GHz band. A licensed spectrum may correspond to channels or frequency bands selected, reserved, regulated, etc., for certain types of wireless activity (e.g., wireless telecommunication network activity), whereas an unlicensed spectrum may correspond to one or more frequency bands that are not restricted for certain types of wireless activity. Whether a particular frequency band corresponds to a licensed medium or an unlicensed medium may depend on one or more factors, such as frequency allocations determined by a public-sector organization (e.g., a government agency, regulatory body, etc.) or frequency allocations determined by a private-sector organization involved in developing wireless communication standards and protocols, etc.

To operate in the unlicensed spectrum, UEs 110 and the RAN nodes 122 may operate using licensed assisted access (LAA), eLAA, and/or feLAA mechanisms. In these implementations, UEs 110 and the RAN nodes 122 may perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

The LAA mechanisms may be built upon carrier aggregation (CA) technologies of LTE-Advanced systems. In CA, each aggregated carrier is referred to as a component carrier (CC). In some cases, individual CCs may have a different bandwidth than other CCs. In time division duplex (TDD) systems, the number of CCs as well as the bandwidths of each CC may be the same for DL and UL. CA also comprises individual serving cells to provide individual CCs. The coverage of the serving cells may differ, for example, because CCs on different frequency bands will experience different pathloss. A primary service cell or PCell may provide a primary component carrier (PCC) for both UL and DL, and may handle RRC and non-access stratum (NAS) related activities. The other serving cells are referred to as SCells, and each SCell may provide an individual secondary component carrier (SCC) for both UL and DL. The SCCs may be added and removed as required, while changing the PCC may require UE 110 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH may carry user data and higher layer signaling to UEs 110. The physical downlink control channel (PDCCH) may carry information about the transport format and resource allocations related to the PDSCH channel, among other things. The PDCCH may also inform UEs 110 about the transport format, resource allocation, and hybrid automatic repeat request (HARQ) information related to the uplink shared channel. Typically, downlink scheduling (e.g., assigning control and shared channel resource blocks to UE 110-2 within a cell) may be performed at any of the RAN nodes 122 based on channel quality information fed back from any of UEs 110. The downlink resource assignment information may be sent on the PDCCH used for (e.g., assigned to) each of UEs 110.

The PDCCH uses control channel elements (CCEs) to convey the control information, wherein a number of CCEs (e.g., 6 or the like) may consists of a resource element groups (REGs), where a REG is defined as a physical resource block (PRB) in an OFDM symbol. Before being mapped to resource elements, the PDCCH complex-valued symbols may first be organized into quadruplets, which may then be permuted using a sub-block interleaver for rate matching, for example. Each PDCCH may be transmitted using one or more of these CCEs, where each CCE may correspond to nine sets of four physical resource elements known as REGs. Four quadrature phase shift keying (QPSK) symbols may be mapped to each REG. The PDCCH may be transmitted using one or more CCEs, depending on the size of the DCI and the channel condition.

There may be four or more different PDCCH formats defined in LTE with different numbers of CCEs (e.g., aggregation level, L=1, 2, 4, 8, or 16).

Some implementations may use concepts for resource allocation for control channel information that are an extension of the above-described concepts. For example, some implementations may utilize an extended (E) PDCCH that uses PDCCH resources for control information transmission. The EPDCCH may be transmitted using one or more ECCEs. Similar to the above, each ECCE may correspond to nine sets of four physical resource elements known as an EREGs. An ECCE may have other numbers of EREGs in some situations.

The RAN nodes 122 may be configured to communicate with one another via interface 123. In implementations where the system is an LTE system, interface 123 may be an X2 interface. The X2 interface may be defined between two or more RAN nodes 122 (e.g., two or more eNBs/gNBs or a combination thereof) that connect to evolved packet core (EPC) or CN 130, or between two eNBs connecting to an EPC. In some implementations, the X2 interface may include an X2 user plane interface (X2-U) and an X2 control plane interface (X2-C). The X2-U may provide flow control mechanisms for user data packets transferred over the X2 interface and may be used to communicate information about the delivery of user data between eNBs or gNBs. For example, the X2-U may provide specific sequence number information for user data transferred from a master eNB (MeNB) to a secondary eNB (SeNB); information about successful in sequence delivery of PDCP packet data units (PDUs) to a UE 110 from an SeNB for user data; information of PDCP PDUs that were not delivered to a UE 110; information about a current minimum desired buffer size at the SeNB for transmitting to the UE user data; and the like. The X2-C may provide intra-LTE access mobility functionality (e.g., including context transfers from source to target eNBs, user plane transport control, etc.), load management functionality, and inter-cell interference coordination functionality.

As shown, RAN 120 may be connected (e.g., communicatively coupled) to CN 130. CN 130 may comprise a plurality of network elements 132, which are configured to offer various data and telecommunications services to customers/subscribers (e.g., users of UEs 110) who are connected to the CN 130 via the RAN 120. In some implementations, CN 130 may include an evolved packet core (EPC), a 5G CN, and/or one or more additional or alternative types of CNs. The components of the CN 130 may be implemented in one physical node or separate physical nodes including components to read and execute instructions from a machine-readable or computer-readable medium (e.g., a non-transitory machine-readable storage medium). In some implementations, network function virtualization (NFV) may be utilized to virtualize any or all the above-described network node roles or functions via executable instructions stored in one or more computer-readable storage mediums (described in further detail below). A logical instantiation of the CN 130 may be referred to as a network slice, and a logical instantiation of a portion of the CN 130 may be referred to as a network sub-slice. Network Function Virtualization (NFV) architectures and infrastructures may be used to virtualize one or more network functions, alternatively performed by proprietary hardware, onto physical resources comprising a combination of industry-standard server hardware, storage hardware, or switches. In other words, NFV systems may be used to execute virtual or reconfigurable implementations of one or more EPC components/functions.

As shown, CN 130, application servers 140, and external networks 150 may be connected to one another via interfaces 134, 136, and 138, which may include IP network interfaces. Application servers 140 may include one or more server devices or network elements (e.g., virtual network functions (VNFs) offering applications that use IP bearer resources with CM 130 (e.g., universal mobile telecommunications system packet services (UMTS PS) domain, LTE PS data services, etc.). Application servers 140 may also, or alternatively, be configured to support one or more communication services (e.g., voice over IP (VoIP sessions, push-to-talk (PTT) sessions, group communication sessions, social networking services, etc.) for UEs 110 via the CN 130. Similarly, external networks 150 may include one or more of a variety of networks, including the Internet, thereby providing the mobile communication network and UEs 110 of the network access to a variety of additional services, information, interconnectivity, and other network features.

As shown, example network 100 may include an NTN that may comprise one or more satellites 160-1 and 160-2 (collectively, "satellites 160"). Satellites 160 may be in communication with UEs 110 via service link or wireless interface 162 and/or RAN 120 via feeder links or wireless interfaces 164 (depicted individually as 164-1 and 164). In some implementations, satellite 160 may operate as a passive or transparent network relay node regarding communications between UE 110 and the terrestrial network (e.g., RAN 120). In some implementations, satellite 160 may operate as an active or regenerative network node such that satellite 160 may operate as a base station to UEs 110 (e.g., as a gNB of RAN 120) regarding communications between UE 110 and RAN 120. In some implementations, satellites 160 may communicate with one another via a direct wireless interface (e.g., 166) or an indirect wireless interface (e.g., via RAN 120 using interfaces 164-1 and 164-2).

Additionally, or alternatively, satellite 160 may include a GEO satellite, LEO satellite, or another type of satellite. Satellite 160 may also, or alternatively pertain to one or more satellite systems or architectures, such as a global navigation satellite system (GNSS), global positioning system (GPS), global navigation satellite system (GLONASS), BeiDou navigation satellite system (BDS), etc. In some implementations, satellites 160 may operate as bases stations (e.g., RAN nodes 122) with respect to UEs 110. As such, references herein to a base station, RAN node 122, etc., may involve implementations where the base station, RAN node 122, etc., is a terrestrial network node and implementation, where the base station, RAN node 122, etc., is a non-terrestrial network node (e.g., satellite 160).

Figure 2:
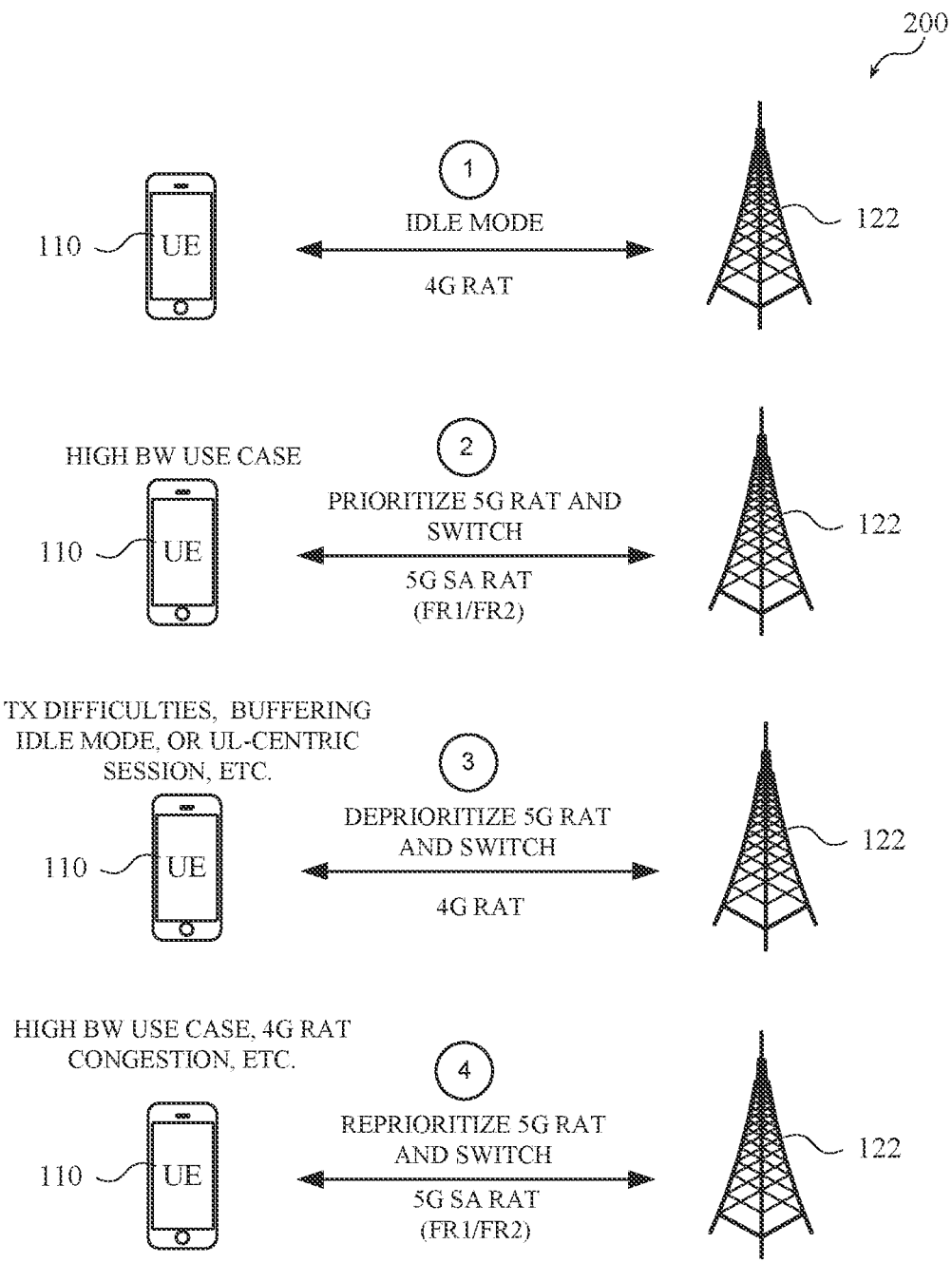
FIG. 2 is a diagram of an example overview of a solution for optimizing radio access technology (RAN) and radio resource selection according to one or more implementations described herein.

FIG. 2 is a diagram of an example overview 200 of a solution for optimizing radio access technology (RAN) and radio resource selection according to one or more implementations described herein. As shown, UE 110 may be in a 4G RAT idle mode within a coverage area of base station 122 (at 1). A user may begin using UE 110, which may trigger a high bandwidth (BW) use case, like streaming data or downloading a movie. UE 110 may exit idle mode and prioritize 5G RAT over 4G RAT, and switch to 5G SA RAT using either FR1 or FR2 (at 2). If UE 110 experiences 5G transmission difficulties, enters a buffering idle mode, begins a UL-centric transmission session, or is finished with the high BW use case, UE 110 may deprioritize 5G RAT and switch to 4G RAT (at 3). Later, if UE 110 experiences another high BW use case, detects significant 4G RAT congestion, etc., UE 110 may reprioritize 5G RAT over 4G RAT and switch back to 5G RAT using FR1 or FR2. These and other features and processes are described herein, with additional details and operations being described below with reference to the figures that follow.

Figure 3:
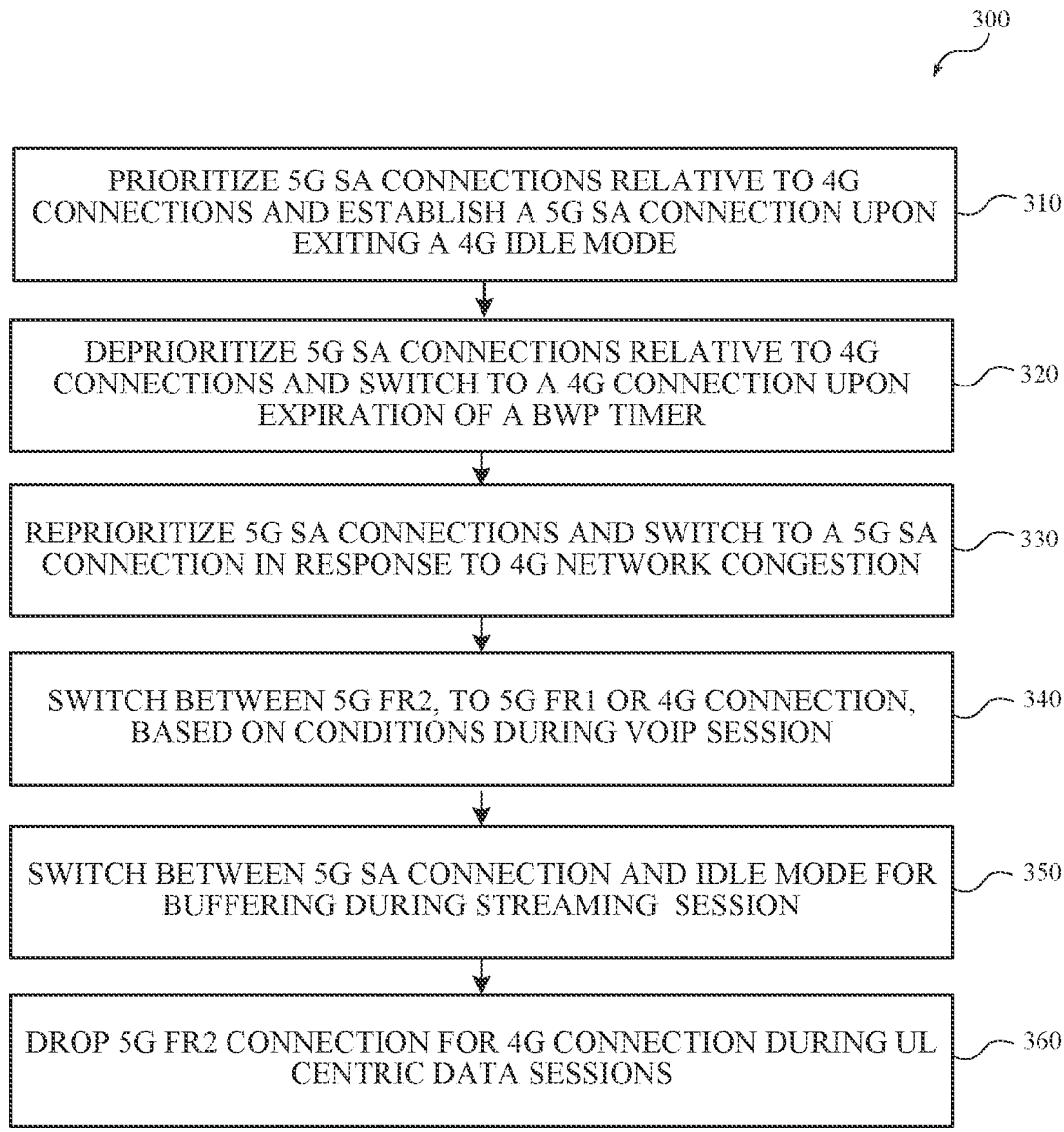
FIG. 3 is a diagram of an example of a process for optimizing RAN and radio resource selection.

FIG. 3 is a diagram of an example of an overview process 300 for optimizing RAN and radio resource selection. Process 300 may be implemented by UE 110. In some implementations, some or all of process 300 may be performed by one or more other systems or devices, including one or more of the devices of FIG. 1, such as base station 122. Additionally, process 300 may include one or more fewer, additional, differently ordered and/or arranged operations than those shown in FIG. 3. In some implementations, some or all of the operations of process 300 may be performed independently, successively, simultaneously, etc., of one or more of the other operations of process 300. As such, the techniques described herein are not limited to a number, sequence, arrangement, timing, etc., of the operations or process depicted in FIG. 3. Additionally, while process 300 may be primarily described from the perspective a particular device (e.g., UE 110), the techniques described herein also include corresponding operations performed by a corresponding device (e.g., base station 122).

Overview process 300 provides brief examples of operations that may be performed using the techniques described herein. Additional details of the operations presented in FIG. 3, as well as additional and alternative features and operations, are described further below with reference to the remaining figures. A shown, process 300 may include prioritizing 5G SA connections relative to 4G connections and establish a 5G SA connection upon existing a 4G idle mode (block 310). For example, UE 110 may be in a 4G idle mode, and upon exiting the idle mode (e.g., by a user unlocking a screen of UE 110), UE 110 may function to prioritize 5G connections over 4G connections and proceed to connect to base station 112 using 5G RAT.

As described herein, being in a 4G RRC idle mode may include UE 110 operating in an idle mode in a manner consistent with the 4G or LTE communication standards of the 3GPP. For example, when in a 4G RRC idle state, UE 110 may have an IP address and may be known by the core network (e.g., an EPC). However, UE 110 may not be known by base station 122. UE 110 may receive broadcast or multi-cast data, may monitor a paging channel to detect incoming calls, and may perform neighbor cell measurements and may do cell selection as well as reselection and acquire system information. By contrast, in a 4G RRC connected state, UE 110 may be known to both the core network and base station 122. Additionally, location of UE 110 is known by the RAN and UE mobility may be UE assisted and network controlled. In an RRC connected state, UE 110 may monitor control channels associated with a shared data channel to determine whether/when data is scheduled for UE 110, and channel quality feedback information may be provided by UE 110 after measurements. UE 110 may also perform neighbor cell measurements of various kinds.

Referring again to FIG. 3, if UE 110 is assigned a high 5G BWP (e.g., a 100 MHz BWP) when a lower 5G BWP (e.g., a 20 MHz BWP) that would be more suitable, UE 110 may deprioritize 5G SA connections, relative to 4G connections and switch to a 4G connection, upon expiration of a BWP switch time (block 320). Later, UE 110 may reprioritize 5G SA connections, relative to 4G connections and switch to a 5G connection if/when UE 110 determines that a level of congestion for the 4G connection has exceeded a pre-determine congestion threshold for 4G connections (at 330). Additionally, if UE 110 is using a 5G SA connection within FR2, and UE 110 begins a VoIP session, UE 110 may switch to a 5G FR1 connection or a 4G connection based on certain conditions during the VoIP session (e.g., successive beam failures, UL leg switches, etc.) (block 340). Additionally, or alternatively, if UE 110 is streaming data (e.g., the user is watching a movie) a 5G NSA connection may be used for buffering the streaming data. Once a portion of the streaming data is buffered (e.g., 60 seconds worth), UE 110 may enter an idle mode until a subsequent portion of the streaming data is to be downloaded and buffered, upon which UE 110 may reestablish a 5G NSA connection, download the subsequent portion of the streaming data, and so on, until the streaming data session is complete (block 350). Additionally, or alternatively, if UE 110 engages in a UL centric data session, while UE 110 is connected to base station 122 via a 5G NSA connection using FR2, UE 110 may switch to a 4G connection for the duration of the UL centric session to, for example, conserve power and network resources during the UL centric data session (block 360).

FIGS. 4-8 include diagrams of example implementations of techniques described herein. As shown, the examples of FIGS. 4-8 may include UE 110 and base station 122. Additionally, UE 110 may include one or more components for performing one or more portions of the examples of FIGS. 4-8, such as application circuitry 402 and baseband (BB) circuitry 404. Such components may correspond to one or more of the devices or components described herein, such as application circuitry 1202 and baseband circuitry 1204 described below with reference to FIG. 12. In some implementations, some or all of the examples of FIGS. 4-8 may be performed by one or more other systems, devices, or components than those shown.

In some implementations, application circuitry 402, operations performed by application circuitry 402, instructions stored by application circuitry 402, etc., may be part of BB circuitry 404. Additionally, or alternatively, a change in a connection (e.g., a 4G RRC connection and 5G connection, 5G SA connection, etc.) may involve one base station or more than one base station depending on the scenario or implementation. One or more of the examples of FIGS. 4-8 may include fewer, additional, differently ordered and/or arranged operations than those shown. Additionally, or alternatively, some or all of the operations of the examples of FIGS. 4-8 may be performed independently, successively, simultaneously, etc., of one or more of the other operations of the examples of FIGS. 4-8. As such, the techniques described herein are not limited to a number, sequence, arrangement, timing, etc., of the entities, operations, or process depicted in FIGS. 4-8, but instead explicitly include variations and rearrangements thereof.

Figure 4:
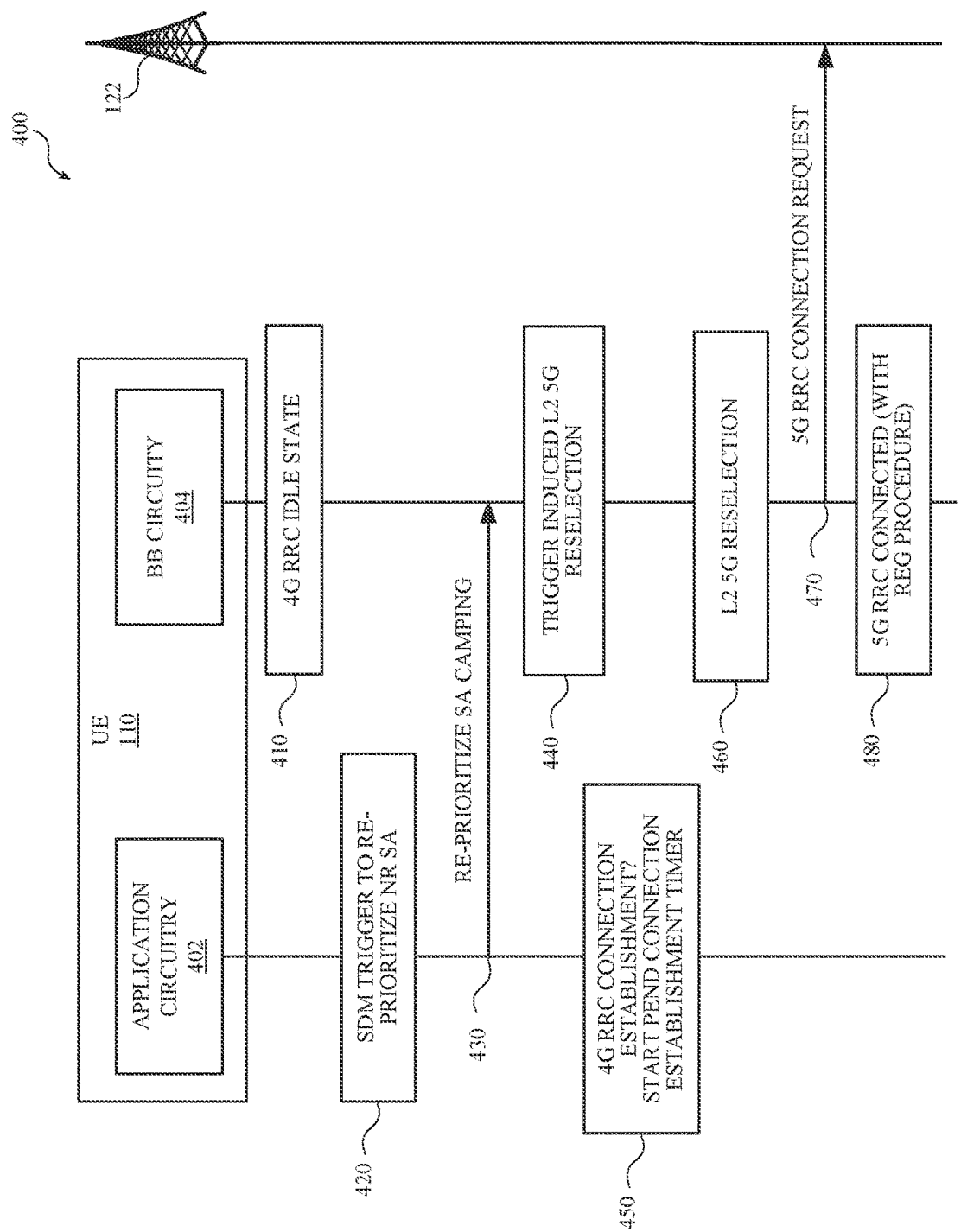
FIG. 4 is a diagram of an example of a process for re-prioritizing standalone (SA) camping from 4th generation (4G) RAT to 5th generation (5G) RAT.

FIG. 4 is a diagram of an example 400 of a process for re-prioritizing standalone (SA) camping from 4G RAT (e.g., LTE RAT) to 5G RAT (e.g., NR RAT. As shown, BB circuitry 404 may be in an 4G (or LTE) RCC idle state (at 410). As described herein, being in a 4G RRC idle mode may include UE 110 operating in an idle mode in a manner consistent with the 4G or LTE communication standards of the 3GPP. For example, when in a 4G RRC idle state, UE 110 may have an IP address and may be known by the core network (e.g., an EPC). However, UE 110 may not be known by base station 122. UE 110 may receive broadcast or multi-cast data, may monitor a paging channel to detect incoming calls, and may perform neighbor cell measurements and may do cell selection as well as reselection and acquire system information. By contrast, in a 4G RRC connected state, UE 110 may be known to both the core network and base station 122. Additionally, location of UE 110 is known by the RAN and UE mobility may be UE assisted and network controlled. In an RRC connected state, UE 110 may monitor control channels associated with a shared data channel to determine whether/when data is scheduled for UE 110, and channel quality feedback information may be provided by UE 110 after measurements. UE 110 may also perform neighbor cell measurements of various kinds.

While in an RRC idle state, UE 110 may be in a screen-locked state. In such a scenario, the user may unlock the screen, which may trigger a smart data mode (SDM) of UE 110, which may include a tool or feature of UE 110 that enables UE 110 to automatically select an appropriate or optimal RAT for UE 110. In some implementations, the SDM may only initiation reprioritization under one or more circumstances. For example, if UE 110 has data to send/receive from base station 120, SDM may initiate reprioritization. However, if UE 10 does not have data to send/receive from base station 120, SDM may not initiation reprioritization. In some implementations, the SDM feature may be disabled by the user.

When the use unlocks the screen, the SDM feature may determine that there is data to send and/or receive from base station 122, which may trigger a reprioritization from a current RAT (e.g., 4G RAT) to a more optimized RAT (e.g., 5G RAT) (at 420). As such, application circuitry 402 may send instructions to BB circuitry 404 to increase the priority of switching from 4G RAT to 5G RAT (e.g., to reprioritize 5G SA camping) (at 430). This may also, or alternatively, be an instruction for BB circuitry 404 to switch from 4G RAT to 5G RAT through reselection (e.g., a Layer 2 (L2) NR reselection), and BB circuitry 404 may response accordingly (at 440). L2NR reselection, as described herein, may include L2NR reselection as described by the 3GPP communication standards.

When a 4G RRC connection has already been established between UE 110 and base station 122, application circuitry 402 may pause the connection during the reprioritization and/or connection upgrade process (at 450). This may include starting a pending connection establishment timer, which may include a duration of time associated with establishing a 5G connection with base station 122. While not shown in FIG. 4, once the new connection is established, the application circuitry may un-pause and continue data communications using the 5G connection. BB circuitry 404 may proceed with 5G reselection (e.g., L2 5G reselection) (at 460) and sending a 5G RRC connection request to base station 122 (at 470). Base station 122 may respond to the connection request and the process may proceed with establishing a 5G RRC concoction between UE 110 and base station 122 and registering UE 110 with the 5G SA network (at 480). As such, techniques described herein may enable UE 110 to promptly transition from 4G (e.g., LTE) to 5G (e.g., NR) in response to, for example, exiting a 4G idle state and detecting data to send and/or receive from the network.

Figure 5:
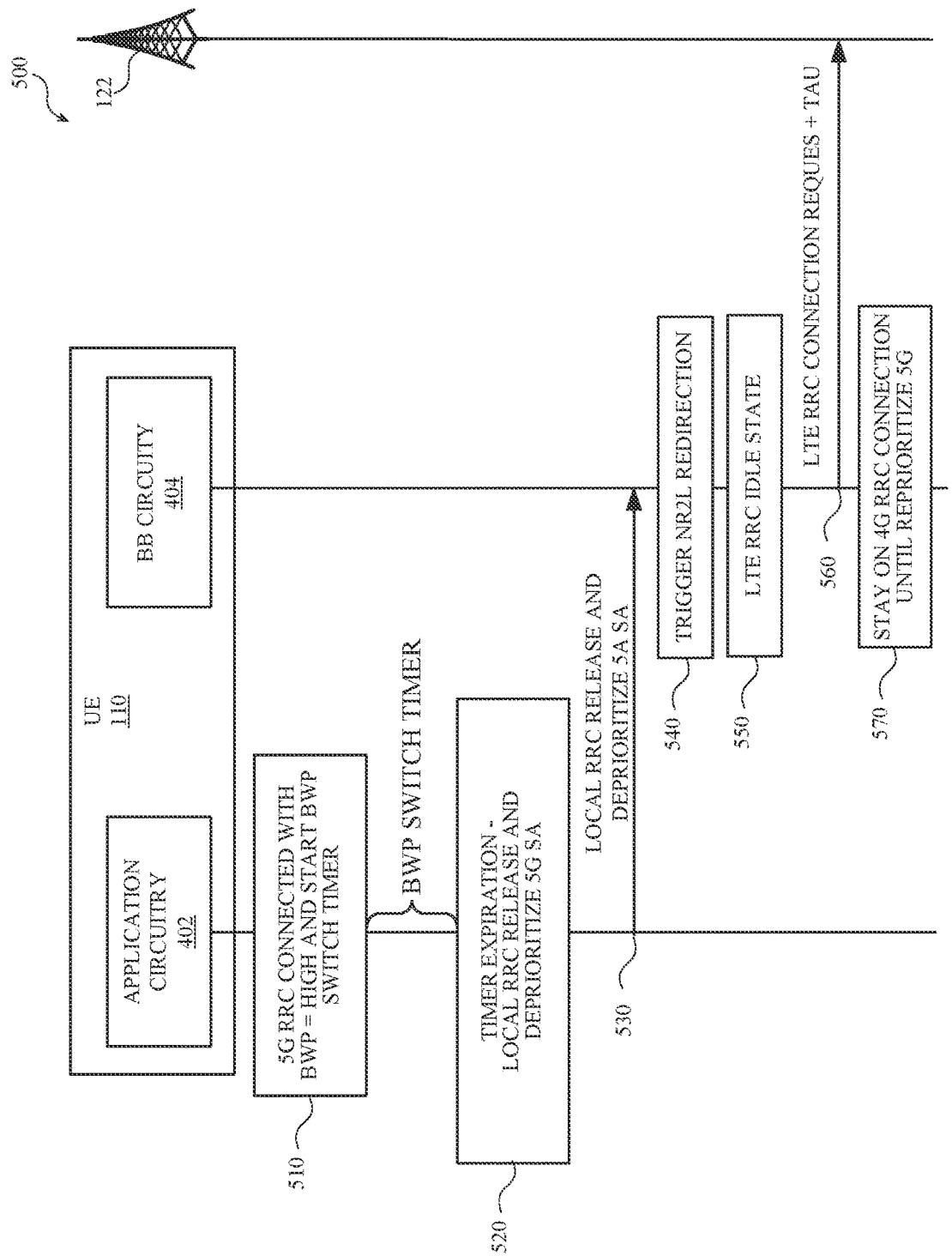
FIG. 5 is a diagram of an example of a process for switching from 5G RAT to 4G RAT due to a lack of bandwidth part (BWP) resources.

FIG. 5 is a diagram of an example 500 of a process for switching from 5G RAT to 4G RAT due to a lack of bandwidth part (BWP) resources. As shown, UE 110 may have established a 5G RRC connection, and registered with, the network. For purposes of explaining FIG. 5, assume that UE 110 is using a relatively high BWP, such as a 100 MHz BWP. Assume also that while UE 110 is in an active mode (e.g., is being used), UE 110 is not engaged in activity germane with maintaining such a high BWP. For example, assume instead that UE 110 is merely being used to browse the Internet, which may be more suitable for a lower BWP such as a 20 MHz BWP. In such a scenario, application circuitry 402 may initiate a BWP switch time, which may include a predetermine duration of time (e.g., 10 seconds, 15 seconds, 20 seconds, etc.) for UE 110 to switch from the higher BWP to the lower BWP (at 510).

If/when UE 110 has not engaged in activity suitable for the high BWP before expiration of the BWP switch timer, and UE 110 has not switched to a more suitable (lower) BWP, before expiration of the BWP switch timer application circuitry 204 (and/or SDM of application circuitry 204) may proceed to perform a local RRC release regarding the 5G RRC connection and to deprioritize 5G SA connections (at 520). For instance, application circuitry 420 may send instructions to BB circuitry 404 to perform a local RRC release and deprioritize 5G SA connections relative to 4G connections (at 530).

In response, BB circuitry 404 may trigger an NR2L redirection procedure (at 540) (e.g., toward establishing a 4G RRC connection with the network) and may enter into a 4G RRC idle state (at 550). A NR2L redirection may include NR2L redirection as described by the 3GPP communication standards. BB circuitry 404 may also communicate an LTE RRC connection request with a tracking area update (TAU) to base station 122 (at 560) to establish a 4G RRC connection with the network, and BB circuitry 404 may remain connected to the network via the 4G RRC connection until UE 110 reprioritizes 5G RRC connections over 4G RRC connections (at 570). As such, when UE 110 is connected via a 5G SA connection with a BWP that is considered too high (e.g., unwarranted) for current data communication activity, UE 110 may optimize the use of RAT by switching to a 4G RRC connection if a more suitable BWP (e.g., a lower BWP) is not allocated to UE 110 before expiration of a BWP switch timer.

Figure 6:
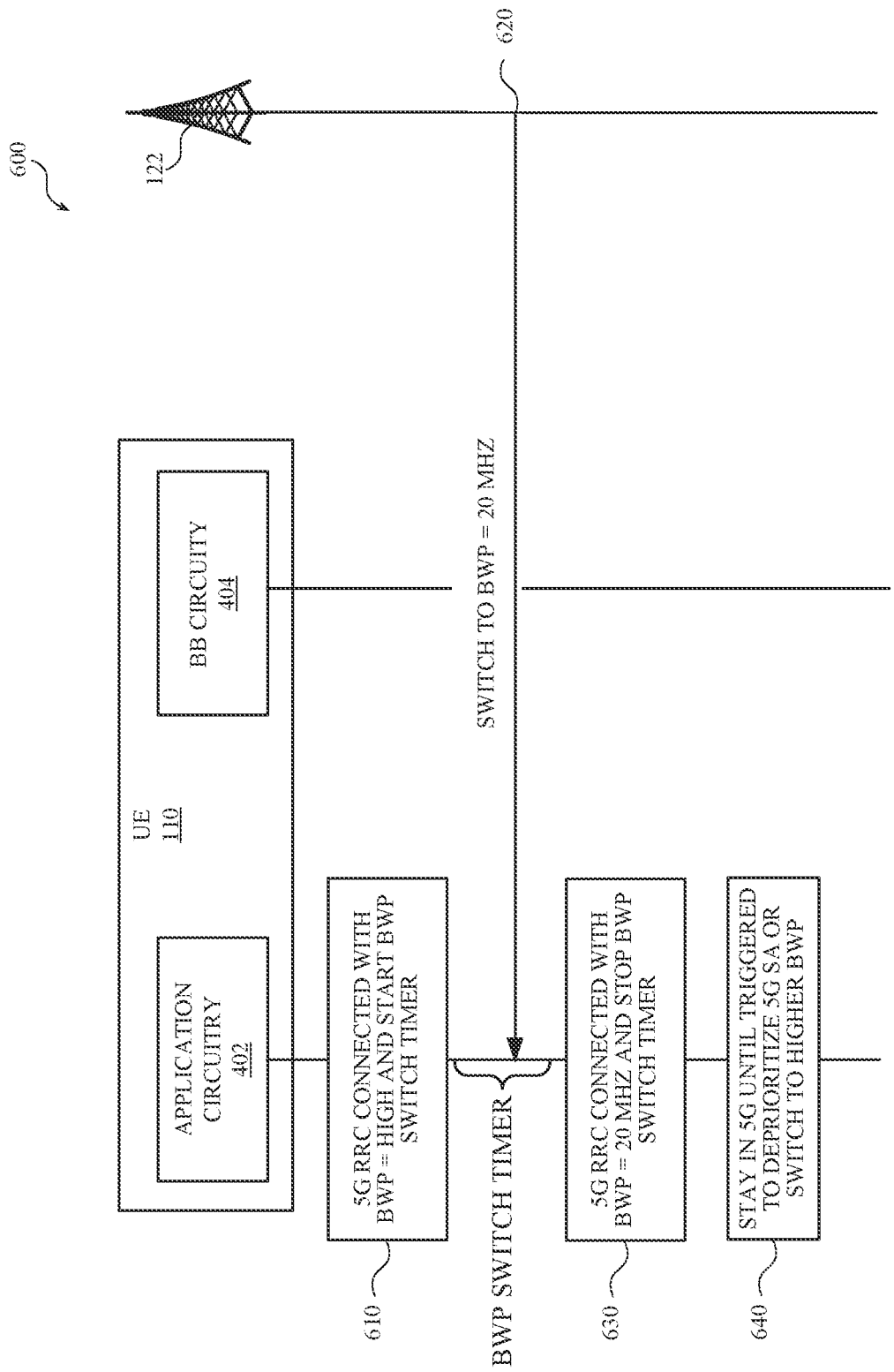
FIG. 6 is a diagram of an example of a process for continuing to use 5G SA RAT due to a change in BWP resources by the network.

FIG. 6 is a diagram of an example 600 of a process for continuing to use 5G SA RAT due to a change in BWP resources by the network. As shown, As shown, UE 110 may have established a 5G RRC connection, and registered with, the network (at 610). For purposes of explaining FIG. 6, assume that UE 110 is using a relatively high BWP, such as a 100 MHz BWP. Assume also that while UE 110 is in an active mode (e.g., is being used), UE 110 is not engaged in activity considered germane with using such a high BWP. For example, assume instead that UE 110 is being used to browse the Internet, which may be considered or classified as more suitable for a lower BWP such as a 20 MHz BWP or less. In such a scenario, application circuitry 402 may initiate a BWP switch time, which may include a predetermine duration of time (e.g., 10 seconds, 15 seconds, 20 seconds, etc.) for UE 110 to switch from the higher BWP to the lower BWP (at 610).

As shown, assume that UE 110 switches to a lower BWP (e.g., a 20 MHz BWP) before expiration of the BWP switch timer (at 620). Upon detecting the switch, application circuitry 420 may determine that the switch occurred before expiration of the BWP switch timer and therefore discontinue the time (at 630). As the current BWP is considered suitable given the current activity (e.g., data throughput designated for web browsing), UE 110 may remain in NR, using the lower BWP until triggered to change (e.g., until activity is detected for which a higher BWP is designated or activity for which 4G RAT is designated) (at 640). As such, when UE 110 is connected via a 5G SA connection with a BWP that is too high for a current data communication activity, UE 110 may optimize the use of RAT by continuing to use the 5G SA connection if a more suitable BWP (e.g., a lower BWP) is allocated to UE 110 before expiration of a BWP switch timer. Otherwise, as described above, UE 110 may switch to an LTE RRC connection.

Figure 7:
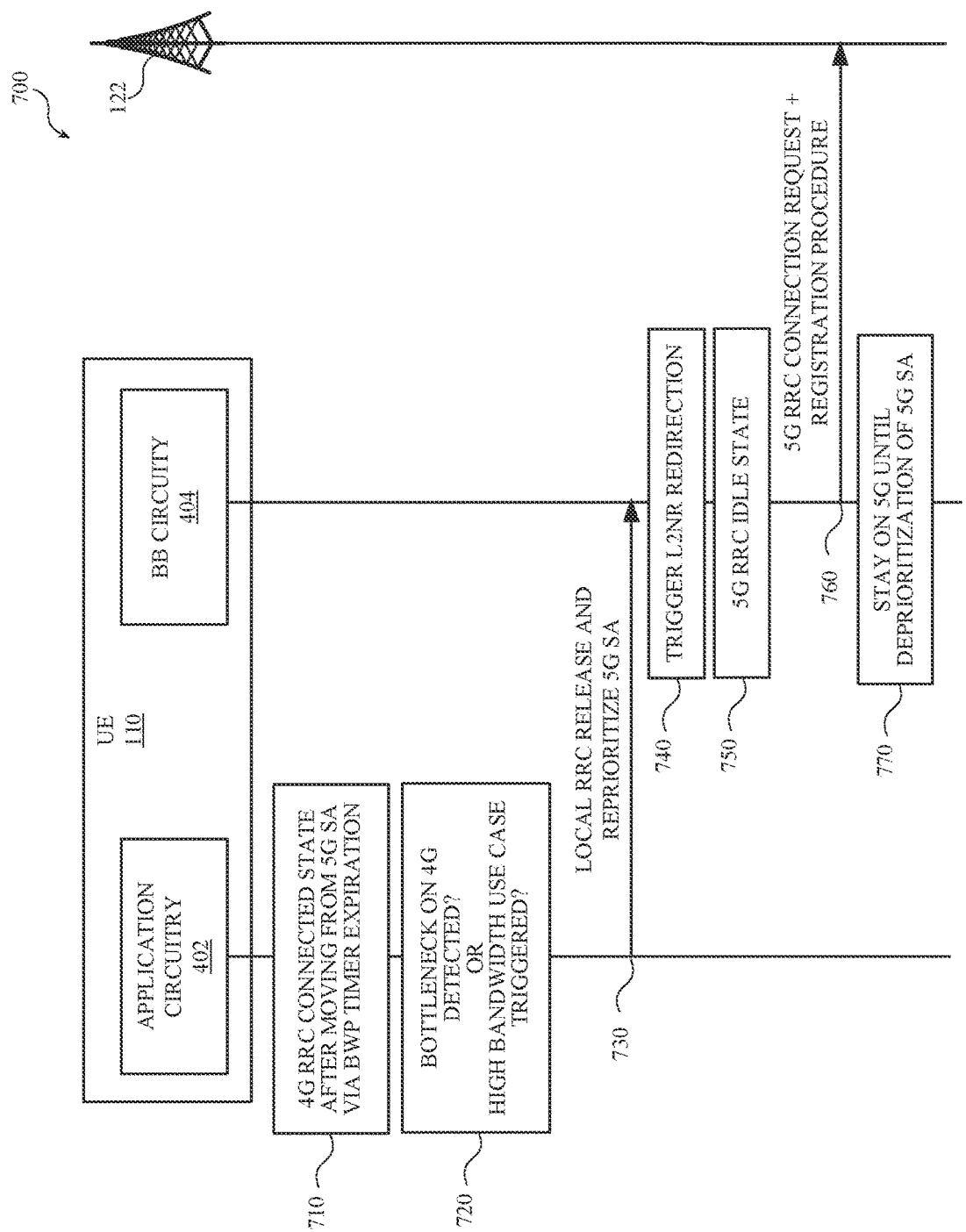
FIG. 7 is a diagram of an example of a process for switching from 4G RAT to 5G SA RAT.

FIG. 7 is a diagram of an example 700 of a process for switching from 4G RAT to 5G SA RAT. As shown, UE 110 may connect to the network via a 4G RRC connection following a transition from a 5G SA connection and expiration of a corresponding BWP switch timer (at 710). While communicating with the network, UE 110 may monitor a level of congestion in the network and determine whether the level of congestion exceeds a pre-defined threshold for congestion. At some point, application circuitry 402 may determine that a level of network congestion (e.g., a bottleneck) exceeds the pre-designated or pre-defined threshold for a level of acceptable congestion for 4G (or LTE) communication with the network (at 720). Additionally, or alternatively, application circuitry 402 may detect or determine that UE 110 is to execute an application and/or engage in a network service associated with using, preferring, etc., a relatively high BWP (e.g., a BWP greater than or equal to 100 MHz) (at 720).

In response, application circuitry 402 may signal to BB circuitry 404 instructions for a local RRC release procedure regarding the 4G connection and reprioritizing 5G SA connections relative to 4G connections (block 730). In response, BB circuitry 404 may trigger an L2NR redirection procedure (at 740) (e.g., toward establishing a 5G RRC connection with the network) and may enter into a 5G RRC idle state (at 750). BB circuitry 404 may also communicate a 5G RRC connection request and proceed with registering with the network via base station 122 (at 760). Upon connecting and registering with the network, and BB circuitry 404 may remain connected via the 5G SA RRC connection until UE 110 deprioritizes 5G RRC connections over 4G RRC connections (at 770). As such, when UE 110 is connected via a 4G connection, and UE 110 detects 4G congestion or UE activity associated with a high BWP and/or throughput, UE 110 may optimize the use of RAT by switching to a 4G RRC connection to a more suitable 5G SA connection that may include a higher BWP.

Figure 8:
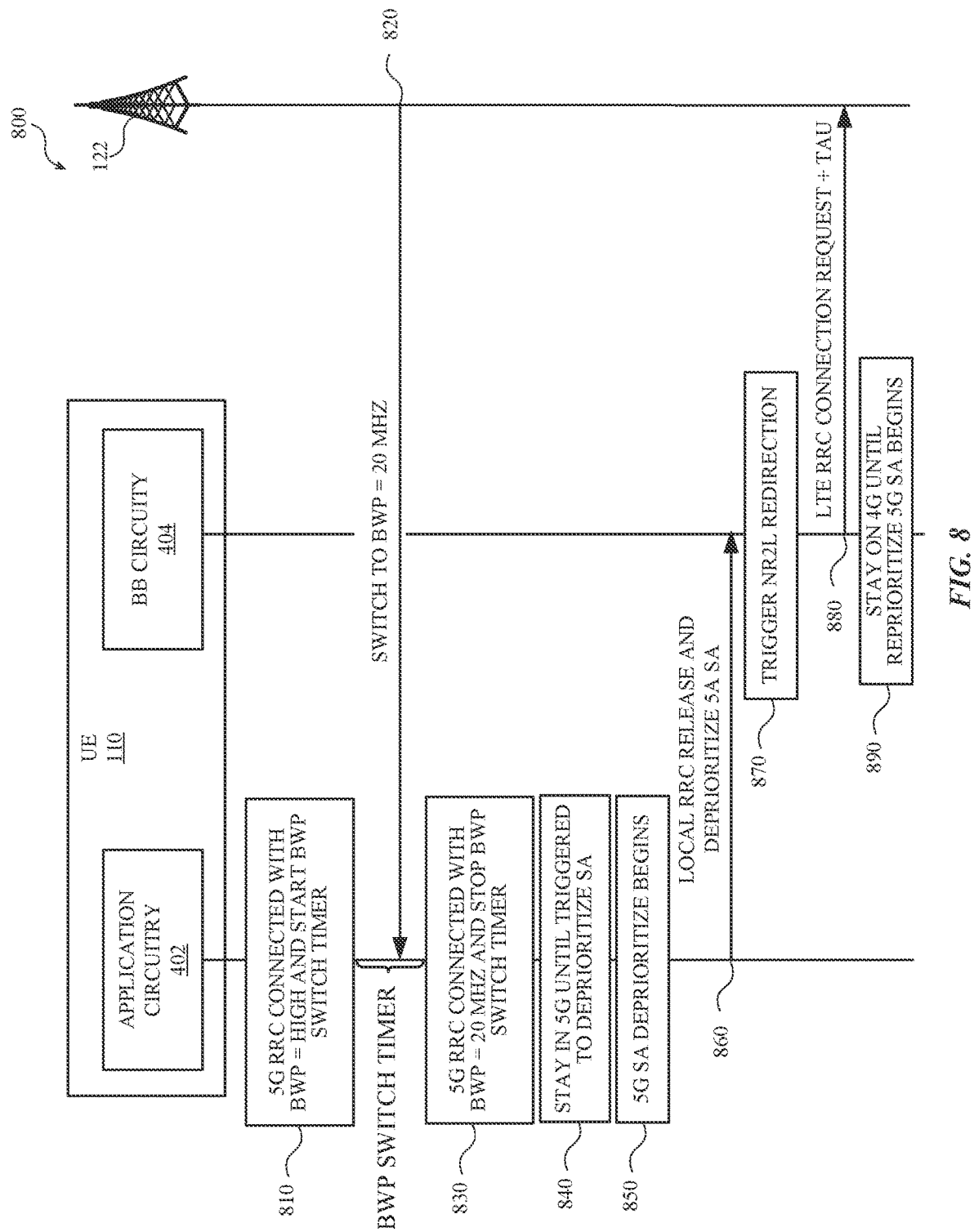
FIG. 8 is a diagram of an example of a process for continuing to use 5G SA RAT despite a change in BWP resources by the network.

FIG. 8 is a diagram of an example of a process for continuing to use 5G SA RAT despite a change in BWP resources by the network. As shown, UE 110 may have established a 5G RRC connection, and registered with, the network (at 810). For purposes of explaining FIG. 6, assume that UE 110 is using a relatively high BWP, such as a 100 MHz BWP. Assume also that while UE 110 is in an active mode (e.g., is being used), UE 110 is not engaged in activity considered germane with using such a high BWP. For example, assume instead that UE 110 is being used to browse the Internet, which may be considered or classified as more suitable for a lower BWP such as a 20 MHz BWP or less. In such a scenario, application circuitry 402 may initiate a BWP switch time, which may include a predetermine duration of time (e.g., 10 seconds, 15 seconds, 20 seconds, etc.) for UE 110 to switch from the higher BWP to the lower BWP.

As shown, assume that UE 110 switches to a lower BWP (e.g., a 20 MHz BWP) before expiration of the BWP switch timer (at 820). Upon detecting the switch, application circuitry 420 may determine that the switch occurred before expiration of the BWP switch timer and therefore discontinue the timer (at 830). As the current BWP is considered suitable, adequate, etc., given the current data activity (e.g., web browsing), UE 110 may remain in NR, using the lower BWP until triggered to change (e.g., until activity is detected for which a higher BWP is designated or activity for which 4G RAT is designated) (at 840).

At some point, UE 110 may detect an event, such as a decrease in UE 110 activity below an activity threshold) prompting application circuitry 402 to deprioritize 5G SA connections relative to 4G connections (at 850). As shown, application circuitry 402 may send a message or instructions to BB circuitry 404 for a local RRC release and deprioritization of 5A SA connections (at 860). As shown, this may trigger BB circuitry 404 to perform an NR2L redirection procedure (at 870) (e.g., toward establishing a 4G RRC connection with the network). BB circuitry 404 may also communicate an LTE RRC connection request with TAU to base station 122 (at 880) to establish a 4G RRC connection with the network, and BB circuitry 404 may remain connected to the network via the 4G RRC connection until UE 110 reprioritizes 5G SA connections over 4G RRC connections (at 890). As such, when UE 110 is connected via a 5G SA connection with a BWP that is too high, UE 110 may optimize RAT usage by continuing to use the 5G SA connection if a more suitable BWP (e.g., a lower BWP) is allocated to UE 110 before expiration of a BWP switch timer. UE 110 may further optimize RAT usage by deprioritizing 5G SA connections and switch to a 4G connection when, for example, UE activity decreases even further.

Figure 9:
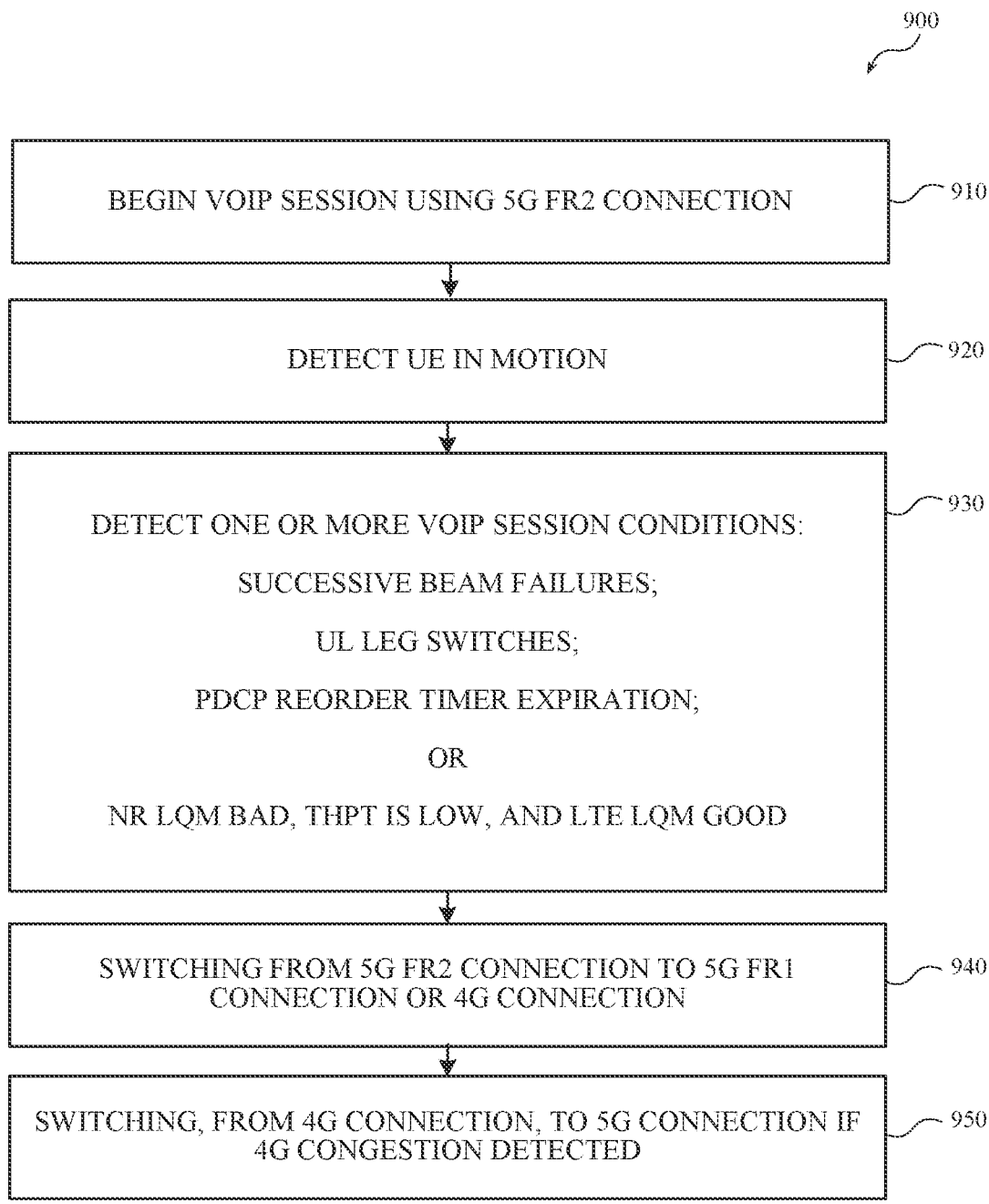
FIG. 9 is a diagram of an example of a process for optimizing RAT for a voice-over Internet Protocol (VoIP) communication session.

FIG. 9 is a diagram of an example of a process 900 for optimizing RAT for a voice-over Internet Protocol (VoIP) communication session. Process 900 may be implemented by UE 110. In some implementations, some or all of process 900 may be performed by one or more other systems or devices, including one or more of the devices of FIG. 1, such as base station 122. Additionally, process 900 may include one or more fewer, additional, differently ordered and/or arranged operations than those shown in FIG. 9. In some implementations, some or all of the operations of process 900 may be performed independently, successively, simultaneously, etc., of one or more of the other operations of process 900. As such, the techniques described herein are not limited to a number, sequence, arrangement, timing, etc., of the operations or process depicted in FIG. 9. Additionally, while process 900 may be primarily described from the perspective a particular device (e.g., UE 110), the techniques described herein also include corresponding operations performed by a corresponding device (e.g., base station 122).

A shown, process 900 may include beginning a VoIP session (block 910). For example, UE 110 may execute an application, operating system feature, and/or another type of service capable of VoIP communications. The VoIP session may be audio only or audio/visual (e.g., a video call). The VoIP session may be between UEs 110, between UE 110 and a network server configured for appropriate data session communications, etc. In some implementations, the VoIP session may begin while UE 110 is stationary (e.g., not moving) and may involve a 5G connection using a BWP of FR2.

Process 900 may include detecting that UE 110 is in motion (block 920). For example, UE 110 may constantly, or periodically, monitor a location and changes in location of UE 110 (or employ other ways of determining whether the UE 110 is in motion). In some implementations, maintaining 5G FR2 beams with the network may be a challenge while UE 110 is in motion, and thus, determining if/when UE 110 is in motion while communicating with base station 122 via 5G FR2 beams may help enable UE 110 evaluate other connection conditions to ensure smooth and constant communication with the network (e.g., by making connection changes if/when helpful) throughout the VoIP session.

Process 900 may include detecting one or more conditions during the VoIP session (block 930). For example, UE 110 may monitor and determine whether one or more beam failures occur during the course of the VoIP session. Doing so may include determining whether a number of beam failures has occurred, within a pre-defined duration, that exceeds a pre-defined threshold for beam failures during a VoIP session. In some implementations, the beam failure threshold may include 3 beam failures during the course the VoIP session. Other examples of conditions that UE may monitor and determine may include whether one or more UL leg (or connection) switches has occurred during the duration of the VoIP session, whether a combination of a poor LQM (e.g., LQM=−107 dB), low throughput (<0.5 Megabits/second (Mbps)), and a good LTE LQM (e.g., LQM=−100 dB) has occurred during the VoIP session, or whether a PDCP reorder timer expiration has occurred during the VoIP session. A default number of UL leg switches may be 1, and a default number of PDCP recorder timer expirations may be 1. Also, a PDCP reorder timer expiration may include expiration of a timer due to a failure of receiving data or packets within a duration defined by the timer.

Process 900 may also include switching from a 5G FR1 connection to a 5G FR2 connection or a 4G connection (block 940). For example, upon detecting that UE 110 is in motion and one or more of the conditions described above with reference to block 930, UE 110 may drop a current 5G FR2 connection with base station 122 and begin using a 5G FR1 connection or 4G connection for the VoIP session. In some implementations, a 5G FR1 connection or 4G connection may be more suited for a VoIP session (e.g., by providing adequate throughput, decreased power consumption, and/or increased reliability) and so switching from the 5G FR2 connection may optimize data services for UE 110 regarding the VoIP session.

Process 900 may include switching to 5G if/when 4G congestion is detected (block 950). For example, if/when UE 110 is communicating with base station 122 using a 4G connection, UE 110 (e.g., a RLGS and/or another UE component) may monitor and determine a level of congestion associated with the 4G connection and compare the level of congestions to a pre-designated congestion threshold. In response to determining that the level of congestion exceeds the congestion threshold for 4G communications, UE 110 may switch (e.g., switch back) to a 5G connection for the VoIP session. In this manner, UE 110 may be configured to optimize RAT usage and performance during a VoIP session be switching from a 5G connection to a 4G connection if/when the 5G connection becomes unreliable, but similarly switch from a 4G connection to a 5G connection if/when the 4G connection becomes unreliable.

Figure 10:
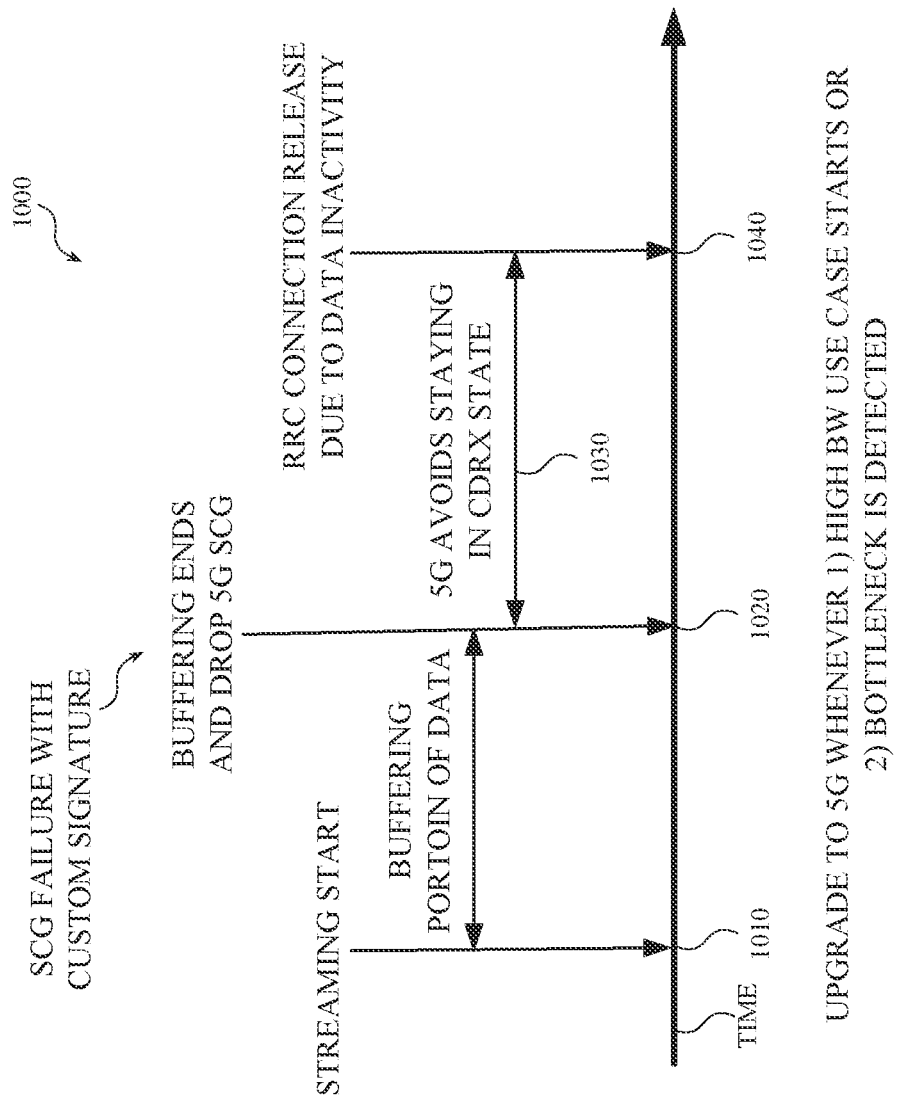
FIG. 10 is a diagram of an example of optimizing RAT for a data streaming session.

FIG. 10 is a diagram of an example 1000 of optimizing RAT for a data streaming session. As shown, example 1000 may include several data streaming events 1010, 1020, 1030, and 1040 presented along a timeline. For example, a data streaming session may begin (at 1010), and UE 110 may engage in buffering a first portion of the streaming data. Once the first portion of the data is buffered, UE 110 may stop buffering for a period of time and drop a 5G connection used to download the buffered data (at 1020). For example, in a few seconds, UE 110 may download a first 60 seconds of a video being streamed, buffer the downloaded data, and drop the 5G connection used to download the data. While the downloaded data is being viewed, UE 110 may remain in a 4G RRC connected mode for a period of time (at 1030) to avoid staying in a connected mode DRX (CDRX) state, and if data inactivity continues, UE 110 will eventually (e.g., within a few more seconds) release the RRC connection (at 1040) and enter an idle mode. In time, a user may near an end of the buffered data, and in response, UE 110 may exit the idle mode, reestablish a 5G RRC connection with base station 122, and download a subsequent portion of the data being streamed. Downloading this subsequent portion may be completed in a few seconds and may involve 60 seconds worth of streaming content, upon which UE 110 may repeat steps 1020, 1030, and 1040 as described above. This series of operations may continue until the data streaming session has been completed or terminated.

At some point (e.g., while UE 110 is in idle mode) UE 110 may also reestablish a 5G connection in response to one or more other events. Examples of such events may include UE 110 having a 4G connection that is used for another service, detecting a level of congestion that exceeds a congestion threshold, and switching the 4G connection to a 5G connection in response to the level of congestion. Additionally, or alternatively, UE 110 may also reestablish a 5G connection in response to UE 110 becoming involved another process (e.g., downloading a movie in the background) that is configured to involve a 5G connection. UE 110 may also reestablish a 5G connection in response to UE 110 existing the idle mode mentioned above for another reasons (e.g., the user has initiated a program or process designed to use a 5G connection. As such, techniques described herein may enable UE 110 to optimize RAT and resources within the context of accessing and buffering data streaming services.

Figure 11:
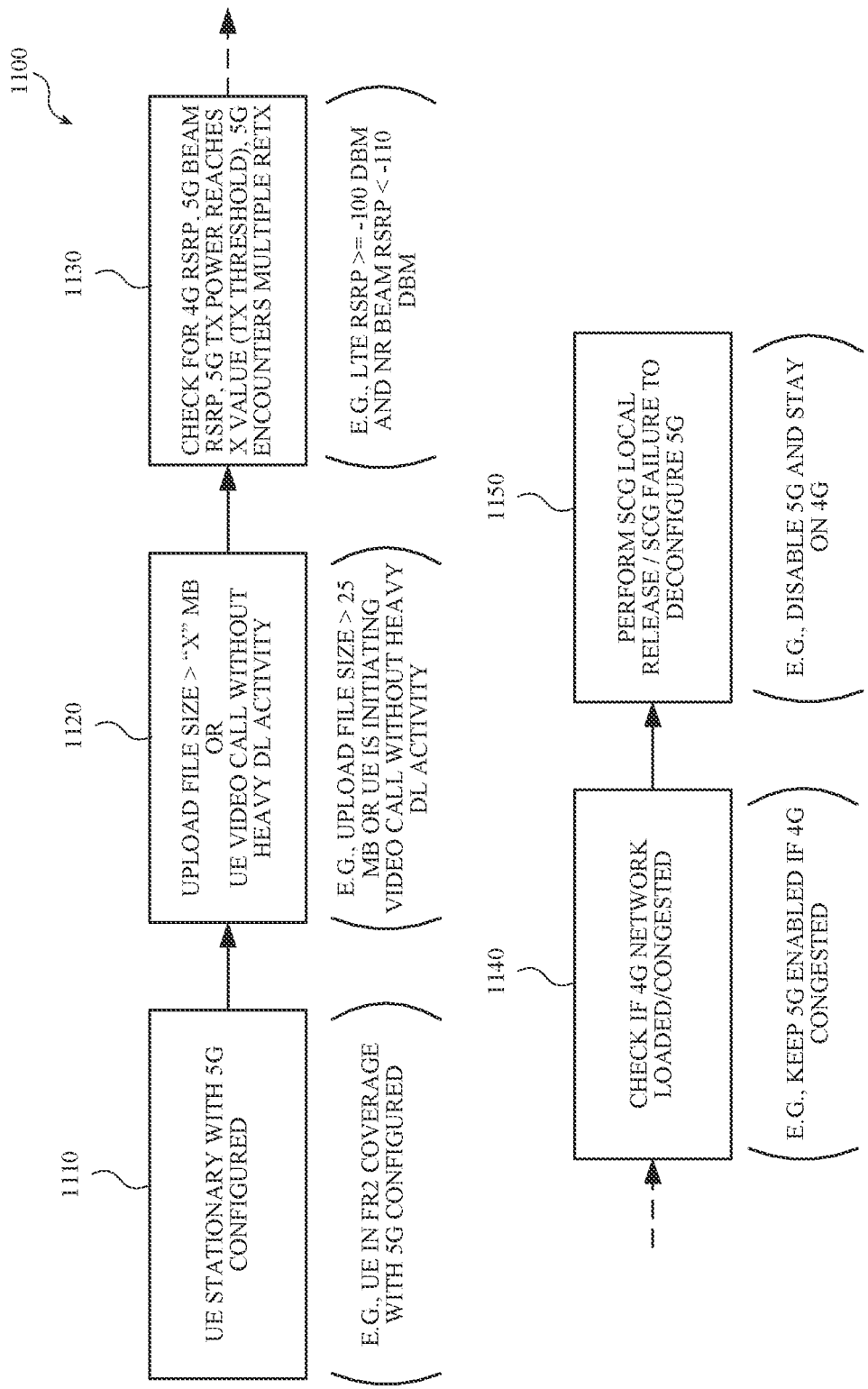
FIG. 11 is a diagram of an example of optimizing RAT for an uplink (UL) centric data session.

FIG. 11 is a diagram of an example 1100 of optimizing RAT for an UL centric data session. A UL centric data session may include a scenario in which UE 110 has a relatively significant amount of information to communicate in the UL direction but not a significant amount of information to receive in the DL direction. Example 1100 may be implemented by UE 110. In some implementations, some or all of example 1100 may be performed by one or more other systems or devices, including one or more of the devices of FIG. 1, such as base station 122. Additionally, example 1100 may include one or more fewer, additional, differently ordered and/or arranged operations than those shown in FIG. 11. In some implementations, some or all of any of the operations of example 1100 may be performed independently, successively, simultaneously, exclusively, etc., of one or more of the other operations, or portions thereof, of example 1100. As such, the techniques described herein are not limited to a number, sequence, arrangement, timing, etc., of the operations or process depicted in FIG. 11. Additionally, while example 1100 may be primarily described from the perspective a particular device (e.g., UE 110), the techniques described herein also include corresponding operations performed by a corresponding device (e.g., base station 122, satellite 160, etc.).

As shown, example 1100 may include UE 110 being stationary while having a 5G connection configured for communication with base station 122 (block 1110). For example, UE 110 may have FR2 coverage/connectivity with 5G SA configured for communicating with the network. UE 110 may have an amount of data (e.g., a file size) greater than a threshold amount of data (e.g., upload data of "X>25 megabytes (MB)") to communicate to base station 122 or be on a video call without heavy DL activity, etc. (block 1120). In such a scenario, UE 110 may check for 4G RSRP (e.g., 4G RSRP is greater than or equal to −100 dBm and 5G RSRP is less than −110 dBm); check whether 5G transmission (Tx) power reaches a transmission power threshold ("Y") and determine whether UE 110 experiences multiple 5G retransmissions (reTx) (block 1130). If so, UE 110 may switch to a 4G connection and communicate the UL data to base station 122 unless UE 122 determines that the 4G network is overly loaded/congested, in which case UE 122 may remain on 5G for communicating the UL data to base station 122 (block 1140). Otherwise, UE 110 may perform secondary cell group (SCG) local release to disable 5G and SCG failure to deconfigure 5G (e.g., to disable 5G and stay on 4G to UL the data) (block 1150).

Figure 12:
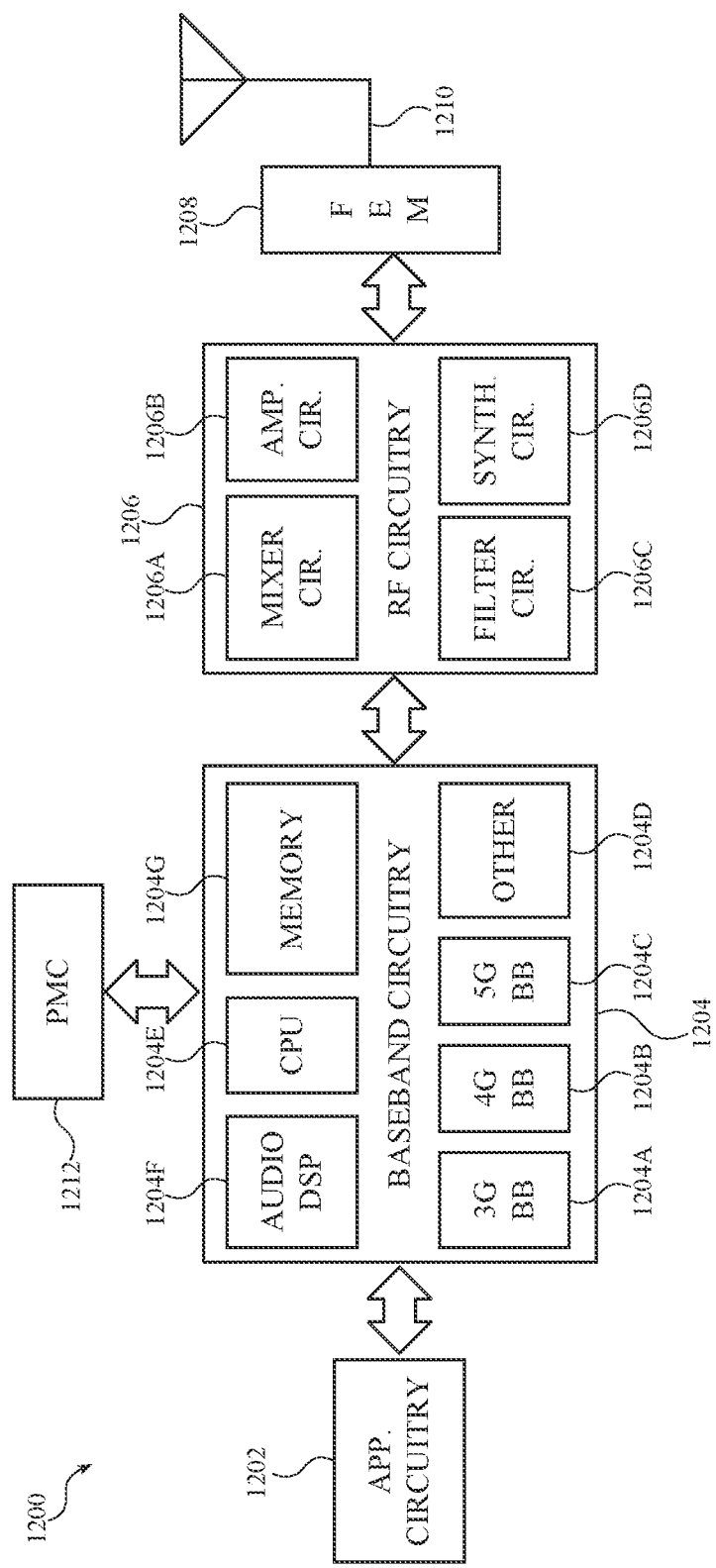
FIG. 12 is a diagram of an example of components of a device according to one or more implementations described herein.

FIG. 12 is a diagram of an example of components of a device according to one or more implementations described herein. In some implementations, the device 1200 can include application circuitry 1202, baseband circuitry 1204, RF circuitry 1206, front-end module (FEM) circuitry 1208, one or more antennas 1210, and power management circuitry (PMC) 1212 coupled together at least as shown. The components of the illustrated device 1200 can be included in a UE or a RAN node. In some implementations, the device 1200 can include fewer elements (e.g., a RAN node may not utilize application circuitry 1202, and instead include a processor/controller to process IP data received from a CN such as 5GC 130 or an Evolved Packet Core (EPC)). In some implementations, the device 1200 can include additional elements such as, for example, memory/storage, display, camera, sensor (including one or more temperature sensors, such as a single temperature sensor, a plurality of temperature sensors at different locations in device 1200, etc.), or input/output (I/O) interface. In other implementations, the components described below can be included in more than one device (e.g., said circuitries can be separately included in more than one device for Cloud-RAN (C-RAN) implementations).

The application circuitry 1202 can include one or more application processors. For example, the application circuitry 1202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/ storage to enable various applications or operating systems to run on the device 1200. In some implementations, processors of application circuitry 1202 can process IP data packets received from an EPC.

The baseband circuitry 1204 can include circuitry such as, but not limited to, one or more single-core or multi-core processors. The baseband circuitry 1204 can include one or more baseband processors or control logic to process baseband signals received from a receive signal path of the RF circuitry 1206 and to generate baseband signals for a transmit signal path of the RF circuitry 1206. Baseband circuity 1204 can interface with the application circuitry 1202 for generation and processing of the baseband signals and for controlling operations of the RF circuitry 1206. For example, in some implementations, the baseband circuitry 1204 can include a 3G baseband processor 1204A, a 4G baseband processor 1204B, a 5G baseband processor 1204C, or other baseband processor(s) 1204D for other existing generations, generations in development or to be developed in the future (e.g., 2G, 6G, etc.). The baseband circuitry 1204 (e.g., one or more of baseband processors 1204A-D) can handle various radio control functions that enable communication with one or more radio networks via the RF circuitry 1206. In other implementations, some or all of the functionality of baseband processors 1204A-D can be included in modules stored in the memory 1204G and executed via a Central Processing Unit (CPU) 1204E. The radio control functions can include, but are not limited to, signal modulation/demodulation, encoding/decoding, radio frequency shifting, etc. In some implementations, modulation/demodulation circuitry of the baseband circuitry 1204 can include Fast-Fourier Transform (FFT), precoding, or constellation mapping/de-mapping functionality. In some implementations, encoding/decoding circuitry of the baseband circuitry 1204 can include convolution, tail-biting convolution, turbo, Viterbi, or Low-Density Parity Check (LDPC) encoder/decoder functionality. Implementations of modulation/demodulation and encoder/decoder functionality are not limited to these examples and can include other suitable functionality in other implementations.

In some implementations, the baseband circuitry 1204 can include one or more audio digital signal processor(s) (DSP) 1204F. The audio DSPs 1204F can include elements for compression/decompression and echo cancellation and can include other suitable processing elements in other implementations. Components of the baseband circuitry can be suitably combined in a single chip, a single chipset, or disposed on a same circuit board in some implementations. In some implementations, some or all of the constituent components of the baseband circuitry 1204 and the application circuitry 1202 can be implemented together such as, for example, on a system on a chip (SOC).

In some implementations, the baseband circuitry 1204 can provide for communication compatible with one or more radio technologies. For example, in some implementations, the baseband circuitry 1204 can support communication with a NG-RAN, an evolved universal terrestrial radio access network (EUTRAN) or other wireless metropolitan area networks (WMAN), a wireless local area network (WLAN), a wireless personal area network (WPAN), etc. Implementations in which the baseband circuitry 1204 is configured to support radio communications of more than one wireless protocol can be referred to as multi-mode baseband circuitry.

RF circuitry 1206 can enable communication with wireless networks using modulated electromagnetic radiation through a non-solid medium. In various implementations, the RF circuitry 1206 can include switches, filters, amplifiers, etc. to facilitate the communication with the wireless network. RF circuitry 1206 can include a receive signal path which can include circuitry to down-convert RF signals received from the FEM circuitry 1208 and provide baseband signals to the baseband circuitry 1204. RF circuitry 1206 can also include a transmit signal path which can include circuitry to up-convert baseband signals provided by the baseband circuitry 1204 and provide RF output signals to the FEM circuitry 1208 for transmission.

In some implementations, the receive signal path of the RF circuitry 1206 can include mixer circuitry 1206A, amplifier circuitry 1206B and filter circuitry 1206C. In some implementations, the transmit signal path of the RF circuitry 1206 can include filter circuitry 1206C and mixer circuitry 1206A. RF circuitry 1206 can also include synthesizer circuitry 1206D for synthesizing a frequency for use by the mixer circuitry 1206A of the receive signal path and the transmit signal path. In some implementations, the mixer circuitry 1206A of the receive signal path can be configured to down-convert RF signals received from the FEM circuitry 1208 based on the synthesized frequency provided by synthesizer circuitry 1206D. The amplifier circuitry 1206B can be configured to amplify the down-converted signals and the filter circuitry 1206C can be a low-pass filter (LPF) or band-pass filter (BPF) configured to remove unwanted signals from the down-converted signals to generate output baseband signals. Output baseband signals can be provided to the baseband circuitry 1204 for further processing. In some implementations, the output baseband signals can be zero-frequency baseband signals, although this is not a requirement. In some implementations, mixer circuitry 1206A of the receive signal path can comprise passive mixers, although the scope of the implementations is not limited in this respect.

In some implementations, the mixer circuitry 1206A of the transmit signal path can be configured to up-convert input baseband signals based on the synthesized frequency provided by the synthesizer circuitry 1206D to generate RF output signals for the FEM circuitry 1208. The baseband signals can be provided by the baseband circuitry 1204 and can be filtered by filter circuitry 1206C.

In some implementations, the mixer circuitry 1206A of the receive signal path and the mixer circuitry 1206A of the transmit signal path can include two or more mixers and can be arranged for quadrature down conversion and up conversion, respectively. In some implementations, the mixer circuitry 1206A of the receive signal path and the mixer circuitry 1206A of the transmit signal path can include two or more mixers and can be arranged for image rejection (e.g., Hartley image rejection). In some implementations, the mixer circuitry 1206A of the receive signal path and the mixer circuitry 1206A can be arranged for direct down conversion and direct up conversion, respectively. In some implementations, the mixer circuitry 1206A of the receive signal path and the mixer circuitry 1206A of the transmit signal path can be configured for super-heterodyne operation.

In some implementations, the output baseband signals and the input baseband signals can be analog baseband signals, although the scope of the implementations is not limited in this respect. In some alternate implementations, the output baseband signals and the input baseband signals can be digital baseband signals. In these alternate implementations, the RF circuitry 1206 can include analog-to-digital converter (ADC) and digital-to-analog converter (DAC) circuitry and the baseband circuitry 1204 can include a digital baseband interface to communicate with the RF circuitry 1206.

In some dual-mode implementations, a separate radio IC circuitry can be provided for processing signals for each spectrum, although the scope of the implementations is not limited in this respect.

In some implementations, the synthesizer circuitry 1206D can be a fractional-N synthesizer or a fractional N/N+1 synthesizer, although the scope of the implementations is not limited in this respect as other types of frequency synthesizers can be suitable. For example, synthesizer circuitry 1206D can be a delta-sigma synthesizer, a frequency multiplier, or a synthesizer comprising a phase-locked loop with a frequency divider.

The synthesizer circuitry 1206D can be configured to synthesize an output frequency for use by the mixer circuitry 1206A of the RF circuitry 1206 based on a frequency input and a divider control input. In some implementations, the synthesizer circuitry 1206D can be a fractional N/N+1 synthesizer.

In some implementations, frequency input can be provided by a voltage controlled oscillator (VCO), although that is not a requirement. Divider control input can be provided by either the baseband circuitry 1204 or the applications circuitry 1202 depending on the desired output frequency. In some implementations, a divider control input (e.g., N) can be determined from a look-up table based on a channel indicated by the applications circuitry 1202.

Synthesizer circuitry 1206D of the RF circuitry 1206 can include a divider, a delay-locked loop (DLL), a multiplexer and a phase accumulator. In some implementations, the divider can be a dual modulus divider (DMD) and the phase accumulator can be a digital phase accumulator (DPA). In some implementations, the DMD can be configured to divide the input signal by either N or N+1 (e.g., based on a carry out) to provide a fractional division ratio. In some example implementations, the DLL can include a set of cascaded, tunable, delay elements, a phase detector, a charge pump and a D-type flip-flop. In these implementations, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 1206D can be configured to generate a carrier frequency as the output frequency, while in other implementations, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency can be a LO frequency (fLO). In some implementations, the RF circuitry 1206 can include an IQ/polar converter.

FEM circuitry 1208 can include a receive signal path which can include circuitry configured to operate on RF signals received from one or more antennas 1210, amplify the received signals and provide the amplified versions of the received signals to the RF circuitry 1206 for further processing. FEM circuitry 1208 can also include a transmit signal path which can include circuitry configured to amplify signals for transmission provided by the RF circuitry 1206 for transmission by one or more of the one or more antennas 1210. In various implementations, the amplification through the transmit or receive signal paths can be done solely in the RF circuitry 1206, solely in the FEM circuitry 1208, or in both the RF circuitry 1206 and the FEM circuitry 1208.

In some implementations, the FEM circuitry 1208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 1206). The transmit signal path of the FEM circuitry 1208 can include a power amplifier (PA) to amplify input RF signals (e.g., provided by RF circuitry 1206), and one or more filters to generate RF signals for subsequent transmission (e.g., by one or more of the one or more antennas 1210).

In some implementations, the PMC 1212 can manage power provided to the baseband circuitry 1204. In particular, the PMC 1212 can control power-source selection, voltage scaling, battery charging, or DC-to-DC conversion. The PMC 1212 can often be included when the device 1200 is capable of being powered by a battery, for example, when the device is included in a UE. The PMC 1212 can increase the power conversion efficiency while providing desirable implementation size and heat dissipation characteristics.

While FIG. 12 shows the PMC 1212 coupled only with the baseband circuitry 1204. However, in other implementations, the PMC 1212 may be additionally or alternatively coupled with, and perform similar power management operations for, other components such as, but not limited to, application circuitry 1202, RF circuitry 1206, or FEM circuitry 1208.

In some implementations, the PMC 1212 can control, or otherwise be part of, various power saving mechanisms of the device 1200. For example, if the device 1200 is in an RRC_Connected state, where it is still connected to the RAN node as it expects to receive traffic shortly, then it can enter a state known as Discontinuous Reception Mode (DRX) after a period of inactivity. During this state, the device 1200 can power down for brief intervals of time and thus save power.

If there is no data traffic activity for an extended period of time, then the device 1200 can transition off to an RRC_Idle state, where it disconnects from the network and does not perform operations such as channel quality feedback, handover, etc. The device 1200 goes into a very low power state and it performs paging where again it periodically wakes up to listen to the network and then powers down again. The device 1200 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 1202 and processors of the baseband circuitry 1204 can be used to execute elements of one or more instances of a protocol stack. For example, processors of the baseband circuitry 1204, alone or in combination, can be used execute Layer 3, Layer 2, or Layer 1 functionality, while processors of the baseband circuitry 1204 can utilize data (e.g., packet data) received from these layers and further execute Layer 4 functionality (e.g., transmission communication protocol (TCP) and user datagram protocol (UDP) layers). As referred to herein, Layer 3 can comprise a RRC layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 13:
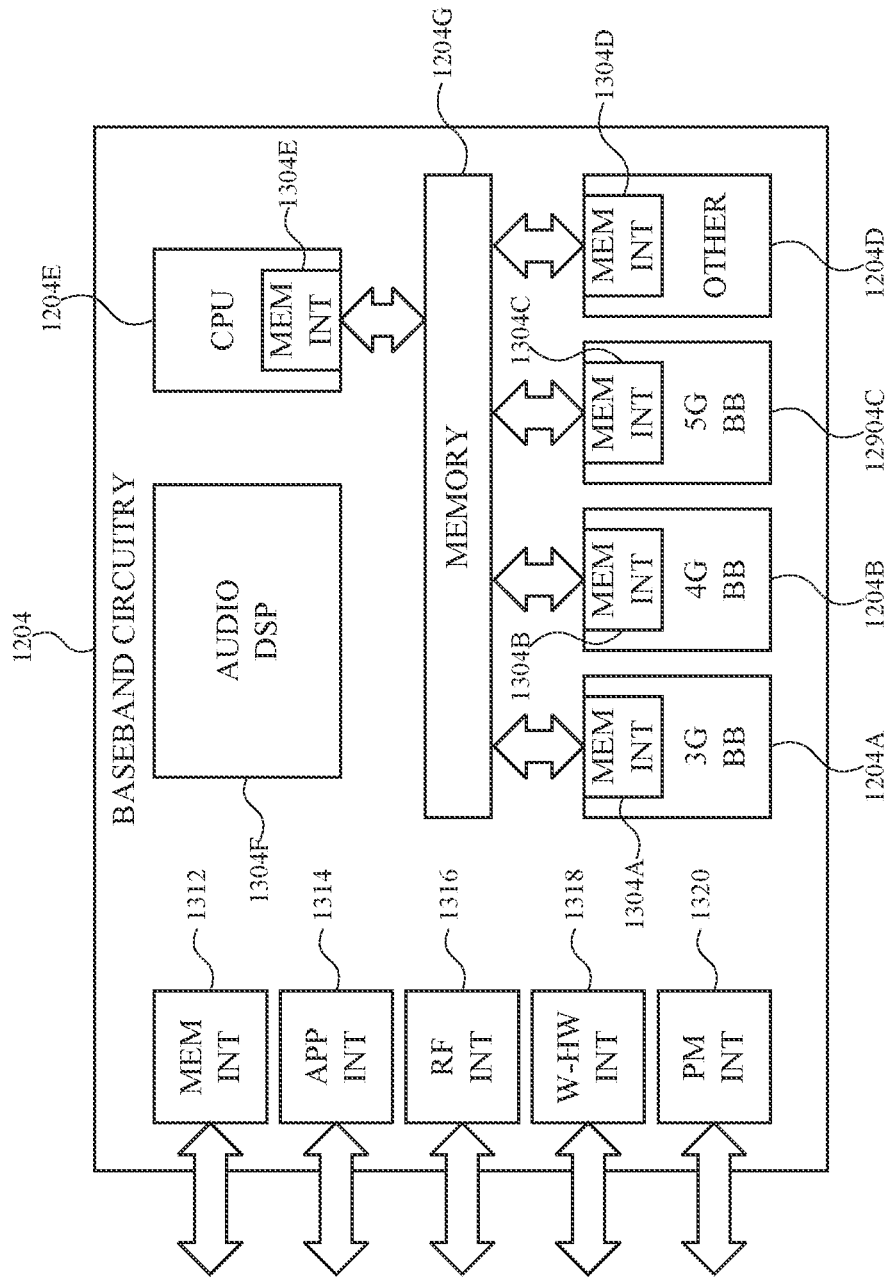
FIG. 13 is a diagram of example interfaces of baseband circuitry according to one or more implementations described herein.

FIG. 13 is a diagram of example interfaces of baseband circuitry according to one or more implementations described herein. As discussed above, the baseband circuitry 1204 of FIG. 12 can comprise processors 1204A-1204E and a memory 1204G utilized by said processors. Each of the processors 1204A-1204E can include a memory interface, 1304A-1304E, respectively, to send/receive data to/from the memory 1204G.

The baseband circuitry 1204 can further include one or more interfaces to communicatively couple to other circuitries/devices, such as a memory interface 1312 (e.g., an interface to send/receive data to/from memory external to the baseband circuitry 1204), an application circuitry interface 1314 (e.g., an interface to send/receive data to/from the application circuitry 1202 of FIG. 12), an RF circuitry interface 1316 (e.g., an interface to send/receive data to/from RF circuitry 1206 of FIG. 12), a wireless hardware connectivity interface 13112 (e.g., an interface to send/receive data to/from Near Field Communication (NFC) components, Bluetooth® components (e.g., Bluetooth® Low Energy), Wi-Fi® components, and other communication components), and a power management interface 1320 (e.g., an interface to send/receive power or control signals to/from the PMC 1212).

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to implementations and examples described.

In example 1, a user equipment (UE) may comprise: one or more processors configured to: operate in a 4th generation (4G) idle mode; prioritize 5th generation (5G) standalone (SA) connections over 4G connections in response to a trigger to reprioritize 5G SA connections; and establish, in response to 5G SA connections being prioritized, a 5G SA connection with a base station of a wireless communication network, the 5G SA connection comprising a high bandwidth part (BWP) of frequency range 1 (FR1) or frequency range 2 (FR2).

In example 2, which may also include one or more of the examples described herein, the one or more processors are further configured to: initiate a BWP switch timer corresponding to the BWP; upon expiration of the BWP switch timer, initiate a radio resource control (RRC) release procedure regarding the 5G SA connection; deprioritize 5G SA connections relative to 4G connections; and establish a 4G connection with the base station of the wireless communication network.

In example 3, which may also include one or more of the examples described herein, the one or more processors are further configured to: detect a level of network congestion, corresponding to the 4G connection, above a network congestion threshold; initiate a RRC release procedure regarding the 4G connection; reprioritize 5G SA connections over 4G connections; and establish another 5G connection with the base station of the wireless communication.

In example 4, which may also include one or more of the examples described herein, the one or more processors are further configured to: detect a request for high bandwidth (BW) network service; initiate a RRC release procedure regarding the 4G connection; reprioritize 5G SA connections over 4G connections; and establish another 5G connection with the base station of the wireless communication.

In example 5, which may also include one or more of the examples described herein, the one or more processors are further configured to: initiate a BWP switch timer corresponding to the BWP; prior to expiration of the BWP timer, switch to a 20-megahertz (MHz) BWP; and discontinue to the BWP switch timer in response to switching to the 20 MHz BWP.

In example 6, which may also include one or more of the examples described herein, the one or more processors are further configured to: detect a trigger to deprioritize 5G SA connections relative to 4G connections; initiate a RRC release procedure regarding the 5G connection; and establish another 4G connection with the base station of the wireless communication.

In example 7, which may also include one or more of the examples described herein, the one or more processors are further configured to: engage in a voice-over Internet Protocol (VoIP) communication session using the 5G SA connection and a FR2 BWP; determine that the UE is in motion; and switch from the FR2 BWP to a FR1 BWP, or a 4G connection, in response to detecting a pre-defined event.

In example 8, which may also include one or more of the examples described herein, the one or more processors are further configured to: successive beam failures exceeding a beam failure threshold; an uplink (UL) switch; expiration of a packet data convergence protocol (PDCP) reorder timer; or a 5G link quality metric (LQM) below a pre-defined 5G LQM threshold, a measured throughput below a pre-defined throughput threshold; and a 4G LQM above a pre-defined 4G LQM threshold.

In example 9, which may also include one or more of the examples described herein, the one or more processors are further configured to: switch, from the 4G connection to the 5G SA connection, in response to detecting a level of network congestion, corresponding to the 4G connection, above a network congestion threshold.

In example 10, which may also include one or more of the examples described herein, the one or more processors are further configured to: engage in a data streaming communication session using the 5G NSA connection; upon buffering an initial portion of the data streaming communication session; enter a 4G idle mode or a 4G connected mode, and disable the 5G NSA connection; and upgrade to the 5G NSA connection in response to at least one of: detection of a level of network congestion, corresponding to the 4G connection, exceeding a network congestion threshold, detection of a request for high BW network service, and exit from the idle mode to buffer a subsequent portion of the data streaming communication session.

In example 11, which may also include one or more of the examples described herein, the one or more processors are further configured to: switch from the 5G SA connection to the 4G connection in response to: an UL centric data session with minimal downlink (DL) activity; and at least one of: a frequency of UL switches exceeding a pre-defined UL switch threshold; a level of network congestion, corresponding to the 4G connection, being below a network congestion threshold; a reference signal received power (RSRP) corresponding to the 4G connection exceeding a pre-determined 4G RSRP threshold; a RSRP corresponding to the 5G SA connection being below a pre-determined 5G beam RSRP threshold; a 4G LQM being above a pre-defined 4G LQM threshold; and a 5G LQM being below a pre-defined 5G LQM threshold.

In example 12, which may also include one or more of the examples described herein, a user equipment (UE) may comprise radio frequency circuitry configured to communicate with a base station of a wireless communications network; baseband circuitry coupled to the application circuitry; and application circuitry, coupled to the baseband circuitry, comprising one or more processors configured to cause the UE to: operate in a 4th generation (4G) idle mode; prioritize 5th generation (5G) standalone (SA) connections over 4G connections in response to a trigger to reprioritize 5G SA connections; and establish, in response to 5G SA connections being prioritized, a 5G SA connection with a base station of a wireless communication network, the 5G SA connection comprising a high bandwidth part (BWP) of frequency range 1 (FR1) or frequency range 2 (FR2).

In example 12, which may also include one or more of the examples described herein, a method, performed by a user equipment (UE), may comprise: operating in a 4th generation (4G) idle mode; prioritizing 5th generation (5G) standalone (SA) connections over 4G connections in response to a trigger to reprioritize 5G SA connections; and establishing, in response to 5G SA connections being prioritized, a 5G SA connection with a base station of a wireless communication network, the 5G SA connection comprising a high bandwidth part (BWP) of frequency range 1 (FR1) or frequency range 2 (FR2).

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

In this regard, while the disclosed subject matter has been described in connection with various examples, implementations, aspects, etc., and corresponding Figures, where applicable, it is to be understood that other similar aspects can be used or modifications and additions can be made to the disclosed subject matter for performing the same, similar, alternative, or substitute function of the subject matter without deviating therefrom. Therefore, the disclosed subject matter should not be limited to any single example, implementation, or aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context may indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A user equipment (UE), comprising:
   radio frequency (RF) circuitry; and
   one or more processors coupled to the RF circuitry and configured to execute instructions stored in a memory to cause the UE to:
      communicate with a base station of a wireless communication network via a 5th generation (5G) frequency range 2 (FR2) connection using the RF circuitry;
      buffer data corresponding to a first portion of a data streaming session using the 5G FR2 connection;
      switch from the 5G FR2 connection to a 5G frequency range 1 (FR1) a 4th generation (4G) connection in response to detecting one or more conditions;
      switch from the 4G connection to the 5G FR2 connection; and
      buffer data corresponding to a second portion of the data streaming session after switching from the 4G connection to the 5G FR2 connection.

2. The UE of claim 1, wherein the one or more conditions comprise successive beam failures, corresponding to the 5G FR2 connection, exceeding a pre-defined threshold for beam failures.

3. The UE of claim 1, wherein the one or more conditions comprise:
   the 5G FR2 connection being used for a voice-over-IP (VoIP) session; and
   an uplink leg switch, corresponding to the 5G FR2 connection, occurring during the VoIP session.

4. The UE of claim 1, wherein the one or more conditions comprise:
   the 5G FR2 connection being used for a voice-over-IP (VoIP) session; and
   a packet data convergence protocol (PDCP) recorder timer expiring during the VoIP session.

5. The UE of claim 1, wherein the one or more conditions comprise:
   the 5G FR2 connection being used for a voice-over-IP (VoIP) session;
   a 5G link quality metric (LQM) being below a pre-defined 5G LQM threshold;
   a throughput of the 5G FR2 connection being below a pre-defined throughput threshold; and
   a 4G LQM being above a pre-defined 4G LQM threshold.

6. The UE of claim 1, wherein the one or more conditions comprise:
   the UE being stationary;
   an amount of uplink (UL) data being greater than a UL data threshold;
   a 4G reference signal received power (RSRP) exceeding a pre-determined 4G RSRP threshold;
   a 5G RSRP being below a pre-determined 5G RSRP threshold;
   a 5G transmission (Tx) power exceeding a pre-defined Tx power threshold; and
   a number of retransmissions (ReTX) exceeding a ReTx threshold.

7. The UE of claim 6, wherein the one or more conditions further comprise:
   a level of network congestion corresponding to the 4G connection being below a network congestion threshold.

8. The UE of claim 1, wherein the one or more conditions comprise:
   the UE being stationary;
   the 5G FR2 connection being used for video call session without downlink (DL) activity exceeding a DL activity threshold;
   a 4G reference signal received power (RSRP) exceeding a pre-determined 4G RSRP threshold;
   a 5G RSRP being below a pre-determined 5G RSRP threshold;
   a 5G transmission (Tx) power exceeding a pre-defined Tx power threshold; and
   a number of retransmissions (ReTx) exceeding a ReTx threshold.

9. The UE of claim 8, wherein the one or more conditions further comprise:
   a level of network congestion corresponding to the 4G connection being below a network congestion threshold.

10. The UE of claim 1, wherein the UE is in a 4G radio resource control (RRC) connected mode upon switching from the 5G FR2 connection to the 4G connection, and the one or more processors are configured to transition to an idle mode upon expiration of an inactivity timer while in the RRC connected mode.

11. A method for a user equipment (UE), comprising:
communicating with a base station of a wireless communication network via a 5th generation (5G) frequency range 2 (FR2) connection;
switching from the 5G FR2 connection to a 5G frequency range 1 (FR1) connection or a 4th generation (4G) connection in response detecting one or more conditions, wherein the one or more conditions include a number of successive beam failures corresponding to the 5G FR2 connection exceeding a pre-defined threshold for beam failures; and
switching from the 5G FR1 connection or the 4G connection to the 5G FR2 connection, in response to a level of congestion corresponding to the 5G FR1 connection or the 4G connection exceeding a pre-defined congestion threshold.

12. The method of claim 11, wherein the one or more conditions further comprise:
the 5G FR2 connection being used for a voice-over-IP (VoIP) session; and
the UE being in motion.

13. The method of claim 11, wherein the one or more conditions further comprise:
the 5G FR2 connection being used for a voice-over-IP (VoIP) session;
the UE being in motion; and
an uplink (UL) leg switch corresponding to the 5G FR2 connection occurring during the VoIP session.

14. The method of claim 11, wherein the one or more conditions further comprise:
the 5G FR2 connection being used for a voice-over-IP (VoIP) session;
the UE being in motion; and
a packet data convergence protocol (PDCP) re order timer expiring during the VoIP session.

15. A non-transitory machine readable storage medium for a user equipment (UE) comprising instructions that, when executed by a processor, cause the processor to perform operations comprising:
communicating with a base station of a wireless communication network via a 5th generation (5G) frequency range 2 (FR2) connection;
switching from the 5G FR2 connection to a 5G frequency range 1 (FR1) connection or a 4th generation (4G) connection in response detecting one or more conditions, wherein the one or more conditions include a number of successive beam failures corresponding to the 5G FR2 connection exceeding a pre-defined threshold for beam failures; and
switching from the 5G FR1 connection or the 4G connection to the 5G FR2 connection, in response to a level of congestion corresponding to the 5G FR1 connection or the 4G connection exceeding a pre-defined congestion threshold.

16. The non-transitory machine readable storage medium of claim 15, wherein the one or more conditions further comprise:
the 5G FR2 connection being used for a voice-over-IP (VoIP) session; and
the user equipment (UE) being in motion.

17. The non-transitory machine readable storage medium of claim 15, wherein the one or more conditions further comprise:
the 5G FR2 connection being used for a voice-over-IP (VoIP) session;
the user equipment (UE) being in motion; and
an uplink leg switch corresponding to the 5G FR2 connection occurring during the VoIP session.

18. The non-transitory machine readable storage medium of claim 15, wherein the one or more conditions further comprise:
the 5G FR2 connection being used for a voice-over-IP (VoIP) session;
the user equipment (UE) being in motion; and
a packet data convergence protocol (PDCP) recorder timer expiring during the VoIP session.

19. The UE of claim 1, wherein the one or more processors further cause the UE to:
switch from the 4G connection to the 5G FR2 connection in response to detecting a level of congestion corresponding to the 4G connection exceeding a pre-defined congestion threshold.

20. The UE of claim 1, wherein the one or more conditions include the data corresponding to the first portion of the data streaming session being buffered.

* * * * *